United States Patent [19]
Kawaguchi et al.

[11] Patent Number: 6,154,782
[45] Date of Patent: Nov. 28, 2000

[54] SERVER SWITCHING BETWEEN COMMUNICATION MODES FOR CLIENTS COUPLED TO THE SERVER

[75] Inventors: Naohisa Kawaguchi; Kazuki Matsui; Takashi Ohno; Akinori Iwakawa, all of Kawasaki, Japan

[73] Assignee: Fujitsu Limited, Kawasaki, Japan

[21] Appl. No.: 09/035,864

[22] Filed: Mar. 6, 1998

[30] Foreign Application Priority Data

Sep. 19, 1997 [JP] Japan ................................ 9-255499

[51] Int. Cl.$^7$ ................................ G06F 15/173
[52] U.S. Cl. ................................ 709/239; 709/203
[58] Field of Search ................................ 709/239, 203, 709/219, 220, 250

[56] References Cited

U.S. PATENT DOCUMENTS

| | | | |
|---|---|---|---|
| 5,513,180 | 4/1996 | Miyake et al. | 370/60.1 |
| 5,574,771 | 11/1996 | Driessen et al. | 379/57 |
| 5,809,415 | 9/1998 | Rossmann | 455/422 |
| 5,893,079 | 4/1999 | Cwenar | 705/36 |
| 5,903,628 | 5/1999 | Brennan | 379/88.21 |
| 5,930,702 | 7/1999 | Goldman et al. | 455/417 |
| 6,021,430 | 2/2000 | Brandt et al. | 709/213 |

*Primary Examiner*—Zarni Maung
*Attorney, Agent, or Firm*—Staas & Halsey LLP

[57] ABSTRACT

In a communication system in which a server, who offers information, and clients, who receive information offering service, are connected with each other via a network, the server has a communication mode selection unit for switching over a communication mode for each client between a one-way communication mode in which information is offered to clients on a one-way basis and a two-way communication mode in which messages are transmitted to clients and messages transmitted from the clients are received.

8 Claims, 31 Drawing Sheets

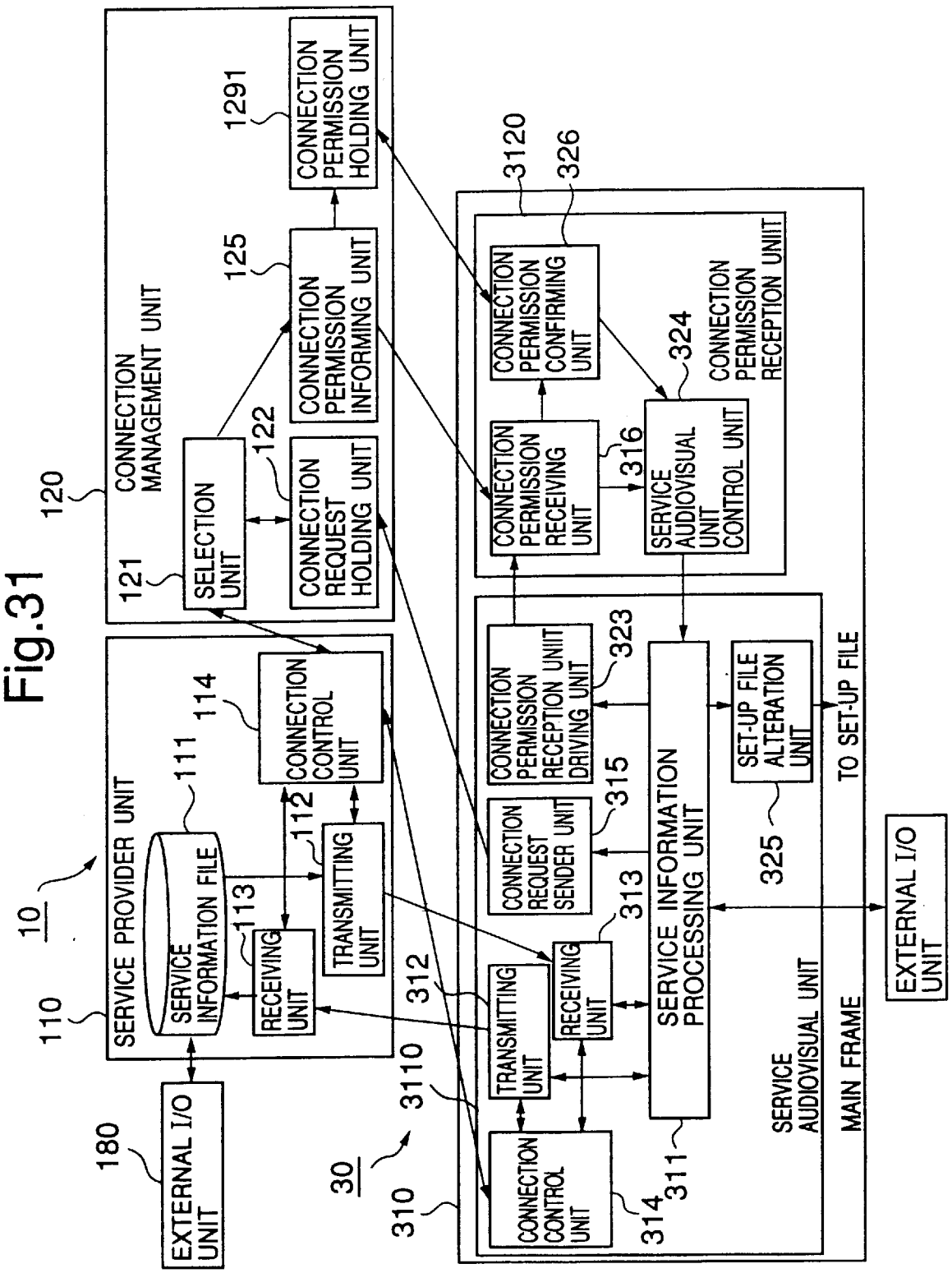

SERVER SWITCHING BETWEEN COMMUNICATION MODES FOR CLIENTS COUPLED TO THE SERVER

BACKGROUND OF THE INVENTION

1. Field of the Invention

The present invention relates to servers and clients connected to each other through a network.

2. Description of the Related Art

Recently, in the internet, there has been widely utilized bilateral information service that handles the data transfer and the conversation of messages between clients and servers as well as storage-type information service, for example, the WWW (World Wide Web), that handles information sent in one way from the client to the server. As examples of such an interactive bilateral information service, there may be raised the chat system, a communication system in which avators of operators of the clients enter a virtual world constructed in a computer system to interact with one another, etc. According to such an interactive service, for example, the chat system, a simultaneous conversation of one hundred persons in a chat room (a virtual room in which the members of the system are able to have a conversation with each other or to communicate together) causes a confusion in the conversation. Thus, in such an interactive service, there exists a suitable number of persons who are able to have simultaneously conversations with each other. Consequently, there is a limit in the number of persons who are allowed to enter a chat room.

However, according to the earlier developed system, there is practiced such a simple processing that the number of persons who are allowed to enter a chat room is simply limited, so that one cannot enter a chat room if the chat room is occupied with the prescribed number of the regular personnel when one wishes to enter the chat room. Thus, in order to enter the chat room, it is necessary to again try to enter the chat room after a while, and in some cases it is necessary to try to enter the chat room over and over. This is the inconvenience.

SUMMARY OF THE INVENTION

In view of the foregoing, it is therefore an object of the present invention to provide servers and clients capable of performing a suitable processing when the communication service limited in the number of participants reaches the limit, or when there occurs again a vacancy in the communication service.

To attain the above-mentioned object, according to the present invention, there is provided a server connected via a network to a plurality of clients for offering information to the plurality of clients, said server comprising:

communication mode selection means for switching over a communication mode for each client between a one-way communication mode in which information is offered to clients on a one-way basis and a two-way communication mode in which messages are transmitted to clients and messages transmitted from the clients are received.

In the present invention, a terminal or the like, which offers the one-way communication service and the two-way communication service to a plurality of clients connected via a network thereto as mentioned above, is referred to as a server.

For example, it is assumed that a certain software house becomes a server and the software house opens a consultative window regarding a software developed by the software house. Further, it is assumed that the capacity of the two-way communication service is determined to 5 and an operator of the server answers questions as to usage of the software raised by 5 questioners (clients). At that time, provided that an additional questioner demands a question, the sixth questioner will be obliged to wait until a vacancy comes (any one of the 5 questioners terminates his question), since it is all the server can do to simultaneously receive questions from 5 questioners and answer their questions. In such a case, the server offers the sixth questioner the one-way communication service in which for example, an explanation of general usage as to the software, a collection of questions and answers to typical questions and the like are provided on a one-way basis. This way makes it possible that the sixth questioner makes good use of his waiting time since it may happen that the collection of questions and answers includes an answer to his question.

Thus, the server according to the present invention comprises the communication mode selection means for switching over a communication mode for each client between the one-way communication mode and the two-way communication mode. This feature makes it possible that the server supplies the one-way communication service to the client who demands the two-way communication service when the two-way communication service is offered with the full capacity, and let the client wait, and when a vacancy comes in the two-way communication service, the one-way communication service is switched over to the two-way communication service.

It is acceptable that the server mentioned above further comprises a communication mode selecting handler for selecting a communication mode as to each client, wherein said communication mode selection means switches the communication mode as to each client in accordance with an operation of said communication mode selecting handler.

In this case, an operator can optionally supply the two-way communication service to a client and optionally stop the two-way communication service to a client.

In the server mentioned above, it is acceptable that said communication mode selection means has timer means for timing a time elapsed since a communication mode as to each client is switched over from the one-way communication mode to the two-way communication mode, and switches over the communication mode as to an associated client from the two-way communication mode to the one-way communication mode when the time elapsed timed by said timer means reaches a predetermined time.

Limiting time for providing the two-way communication service makes it possible to provide a fair service.

In the server mentioned above, it is preferable that said communication mode selection means has request holding means for holding information to identify a client made a request of a two-way communication service, and switches over the communication mode as to a client selected from among the clients identified by the information held by said request holding means from the one-way communication mode to the two-way communication mode.

Thus, in the server according to the present invention, said communication mode selection means has the request holding means. This feature makes it possible to identify a client made a request of a two-way communication service, and thereby preventing such a mistake that the service is erroneously supplied to another client who does not request the service.

In the event that said communication mode selection means has the request holding means, it is acceptable that said request holding means holds information to identify clients made a request of a two-way communication service and in addition information representative of reception order of the request of the two-way communication service, and said communication mode selection means switches over the communication mode as to a client involved in the earliest order in the reception order of the request of the two-way communication service, of the clients identified by the information held by said request holding means, from the one-way communication mode to the two-way communication mode. Alternatively, it is acceptable that said request holding means holds information to identify clients made a request of a two-way communication service and in addition information representative of an amount of payment on each client to be paid for the two-way communication service, and said communication mode selection means switches over the communication mode as to a client involved in the largest amount in the amount of payment, of the clients identified by the information held by said request holding means, from the one-way communication mode to the two-way communication mode. Further, it is also acceptable that said communication mode selection means switches over the communication mode as to a client randomly selected from among the clients identified by the information held by said request holding means from the one-way communication mode to the two-way communication mode.

In this manner, when a client, to which the two-way communication service is supplied, is selected from among clients specified by the request holding means, if any rule is determined beforehand, then it is possible to save trouble of an operator of the server.

Further, in the event that said communication mode selection means has the request holding means, it is acceptable that the server according to the present invention further comprises a profile data base for storing profiles of clients as to utilization circumstances of the server, wherein said communication mode selection means switches over the communication mode as to a client selected referring to said profile data base from among the clients identified by the information held by said request holding means, from the one-way communication mode to the two-way communication mode.

Specifically, it is acceptable that said profile data base includes information representative of a cumulative time on each client regarding accumulation of two-way communication services of the server, and said communication mode selection means switches over the communication mode as to a client involved in the longest time in the cumulative time, of the clients identified by the information held by said request holding means, from the one-way communication mode to the two-way communication mode. Alternatively, it is acceptable that said profile data base includes information representative of an acceptance time on each client regarding last two-way communication service of the server, and said communication mode selection means switches over the communication mode as to a client involved in the longest time in a time elapsed since the client received the last two-way communication service of the server, of the clients identified by the information held by said request holding means, from the one-way communication mode to the two-way communication mode.

It is to be noted that a starting time of the above-referenced "time elapsed" may be a starting time of the last two-way communication service, a termination time of the last two-way communication service, or a representative time on the way of the last two-way communication service.

In this manner, preparation of the profile data base makes it possible to switch the two-way communication service over to the more suitable client.

Further, in the event that said communication mode selection means has the request holding means, it is acceptable that the server according to the present invention further comprises an information display unit for displaying the information held by said request holding means, and a client designation handler for designating a client to be switched in the communication mode from the one-way communication mode to the two-way communication mode, from among the clients identified by the information held by said request holding means, wherein said communication mode selection means switches over the communication mode as to a client designated through operation of said client designation handler, from the one-way communication mode to the two-way communication mode.

In this case, it is possible that an operator of the server displays on the information display unit the information held by the request holding means, that is, clients which demand the two-way communication service, and while the operator looks at the display unit, the operator can supply the two-way communication service to the client which is deemed to be preferable to the operator.

In this case, it is preferable that said request holding means accepts a request of a two-way communication service issued from clients and also information associated with messages intended to be transmitted to the server when an associated client receives the two-way communication service, and holds information to identify clients made the request of the two-way communication service and in addition information for each client associated with messages intended to be transmitted to the server, and wherein said information display unit displays the information to identify clients made the request of the two-way communication service, said information being held by said request holding means, and also the information for each client associated with messages intended to be transmitted to the server.

This feature makes it possible that an operator of the server more exactly selects a client, to which the two-way communication service is to be supplied, from among clients which demand the two-way communication service.

It is also acceptable that the server according to the present invention further comprises a profile data base for storing profiles of clients as to utilization circumstances of the server, wherein said information display unit displays the information held by said request holding means, and also the profiles stored in the said-profile data base.

This feature makes it possible that an operator of the server more exactly supply the two-way communication service to a client referring to the profiles displayed on the information display unit.

Further, in the event that said communication mode selection means has the request holding means, it is preferable that said communication mode selection means has two-way communication service start notice means for giving notice, prior to altering a communication mode as to a client selected from among the clients identified by the information held by said request holding means, of a start of a two-way communication service to the client.

This feature makes it possible that when a client, which receives the notice, does not yet get ready for a two-way communication, then the client prepares for the two-way communication.

In this case, it is preferable that said communication mode selection means switches over, upon receipt of a notification of complete preparation representative of a matter that a preparation for receiving a two-way communication service has been completed from the client who received the notice of the start of the two-way communication service by said two-way communication service start notice means, the communication mode as to the client from the one-way communication mode to the two-way communication mode.

This feature makes it possible that even if the preparations are somewhat late, the client receives the two-way communication service after everything is ready.

In this case, it is preferable that said communication mode selection means has notification holding means for holding information to identify a client issued the notification of complete preparation, and switches over the communication mode as to the client identified by the information held by said notification holding means from the one-way communication mode to the two-way communication mode.

This feature makes it possible that for example, in the event that a plurality of vacancies simultaneously comes in the two-way communication service, the notice is simultaneously issued to a plurality of clients and the server switches over the communication mode for the respective clients to the two-way communication mode in order of the arrival of the notification of complete preparation without taking complicated steps in a matter such that the notice is issued to a certain client, and when the notification of complete preparation from the client arrives at the server, then the notice is issued to another client.

Furthermore, in the event that said communication mode selection means has the request holding means, it is preferable that said request holding means holds on a renewable basis an address of a-client, who made a request of a two-way communication service, providing access to the server in association with information to identify the client made the request of the two-way communication service.

In case of a so-called dial-up connection in which a circuit connection with a client is established each time it happens, an address (IP address), which is assigned to the client when a circuit is once disconnected and then connected, is varied each time it happens.

Thus, in the manner as mentioned above, the request holding means holds on a renewable basis an address of a client, who made a request of a two-way communication service, providing access to the server. This feature makes it possible that in case of such a dial-up connection, even if a circuit is once disconnected, when the circuit is again connected, the request of the two-way communication service made before disconnection of the circuit is still effective without a request of the two-way communication service being reissued, and then the server supplies the two-way communication service to the client when the vacancy comes in the two-way communication service.

Still further, in the event that said communication mode selection means has the request holding means, it is preferable that said request holding means holds a telephone number associated with a client, who made a request of a two-way communication service, in association with information to identify the client made the request of the two-way communication service, and wherein said communication mode selection means has audio message transmitting means for transmitting a predetermined audio message, in the event that at a time point that the communication mode as to a client selected from among the clients identified by the information held by said request holding means is intended to be altered, a connection with the client on the network is disconnected, through calling the telephone number associated with the client.

This feature makes it possible that a client, which demanded the two-way communication service, knows through a telephone that his turn comes, even in the state that the circuit on the network is kept on disconnection.

Still furthermore, in the event that said communication mode selection means has the request holding means, it is preferable that said request holding means accepts cancellation of a request of a two-way communication service by the client who made the request of the two-way communication service, and deletes information to identify the client issued the cancellation from among pieces of information held in said request holding means.

The reason why this is to do so is that it happens that there will occur a necessity for cancellation of the request of the two-way communication service owing to a change of the situation after the two-way communication service was demanded.

Still furthermore, in the event that said communication mode selection means has the request holding means, it is preferable that said server further comprises request information offering means for offering information held in said request holding means to clients.

This feature makes it possible that a client knows the stand-by state from the offered information, and thereby determining whether the two-way communication service is to be demanded.

In the server according to the present invention as mentioned above, it is preferable that said server further comprises communication contents offering means for offering interactive contents with a client receiving the two-way communication service to another client.

The reason why this is to do so is that it often happens that it is instructive for a client waiting the two-way communication service to know interactive contents between the server and another client.

Further, in the server according to the present invention as mentioned above, it is preferable that said server comprises an aggregate of a plurality of servers each for offering the two-way communication service to clients, said aggregate including a representative server for accepting requests of the two-way communication service issued from clients, and wherein said representative server has request distributing means for distributing the requests of the two-way communication service issued from clients to the plurality of servers constituting the aggregate.

In the server as mentioned above, it is acceptable that said request distributing means determines a destination of distribution of the two-way communication service to clients, referring to a number of clients, for each of the plurality of servers, to which an associated server offers the two-way communication service.

Constructing a system of such a server makes it possible to avoid such a situation that while a certain sever is concerned with a vacancy in the two-way communication service, another server is busy in the two-way communication service, and thereby impartially sharing the loads among a plurality of servers and also improving a service to the clients.

Further, in the server according to the present invention as mentioned above, it is preferable that said server comprises an aggregate of a plurality of servers each for offering the two-way communication service to clients, and said server has service offerer alteration means for altering a server, which offers the two-way communication service to a same client, mutually among the plurality of servers.

For example, it is assumed that the above-mentioned software house opens servers as consultative windows. And it is also assumed that an operator as a generalist who can answer to the general questions, and an operator as a specialist who can answer to the special questions are in charge of the associated servers, respectively. In this situation, the above-mentioned structure of the server according to the present invention makes it possible that for example, when an operator as the generalist is asked with a special question, the server involved in the client asked the special question is switched over to the server which the operator, who knows contents of the question, is in charge of, and thereby improving the service to clients.

Furthermore, in the server according to the present invention as mentioned above, it is preferable that said server further comprises: message inputting means for inputting a message to be transmitted to a client; input state monitoring means for monitoring an inputting state of the message entered from said inputting means; and input state informing means for informing the client of the inputting state of the message entered from said inputting means, said inputting state of the message being monitored by said input state monitoring means.

This feature makes it possible that the client side knows the behavior of the server side, for example, such a manner that the server is intended to answer the question.

Still further, in the server according to the present invention as mentioned above, it is preferable that said server further comprises operator state informing means having a state input handler for inputting interaction possibility information indicative of whether an operator of said server is in a state that the operator is able to have an interaction with a client, said operator state informing means informs the client of the interaction possibility information entered through said state input handler.

This feature makes it possible that the client side knows whether an operator is now in the state that he is able Aid to have an interaction.

Still furthermore, in the server according to the present invention as mentioned above, it is preferable that said server further comprises interaction contents recording means for recording interaction contents with a client received the two-way communication service.

This feature makes it possible that taking by way of example the servers established by the above-mentioned software house, the interactive contents are edited later to provide a complete collection of questions and answers, and thereby contributing to the effective utilization of the past interactive contents.

To attain the above-mentioned object, according to the present invention, there is provided a first client connected via a network to a server adapted for choosing a communication mode for each client between a one-way communication mode in which information is offered to clients on a one-way basis and a two-way communication mode in which messages are transmitted to clients and messages transmitted from the clients are received, said client comprising:

message transmitting and receiving means, having two-way communication service request means for requesting of said server a two-way communication service, for performing transmission and reception of messages between the client and said server, said message transmitting and receiving means being free to be stopped and started in operation;

service start notification receiving means for receiving a two-way communication service start notification from said server; and message transmitting and receiving means driving means for driving said message transmitting and receiving means.

According to the first client of the present invention, there is provided such an arrangement that the message transmitting and receiving means is driven when the service start notification receiving means receives the two-way communication service start notification from the server. This arrangement permits only the service start notification receiving means and the message transmitting and receiving means driving means to be always in the operable state, but the message transmitting and receiving means is not needed to be always in the operable state. That is, the message transmitting and receiving means is driven upon receipt of the two-way communication service start notification from the server. This feature makes it possible that an operator makes other works while the message transmitting and receiving means is in a rest state for the two-way communication service.

In the first client of the present invention as mentioned above, it is preferable that the client further comprises setting up means for setting up beforehand said service start notification receiving means and said message transmitting and receiving means driving means to be driven when a power source of said client is turned on.

In this case, when once the setting up means is enabled, there is provided a state that the two-way communication service start notification from the server can be received, when a power source of said client is turned on. Thus, the message transmitting and receiving means is driven upon receipt of the two-way communication service start notification from the server.

In the first client of the present invention as mentioned above, it is preferable that the client further comprises service start notification inquiring means for inquiring of said server whether said server has issued already the service start notification to said client, wherein said setting up means sets up beforehand said service start notification receiving means, said message transmitting and receiving means driving means and said service start notification inquiring means as well to be driven when the power source of said client is turned on, and wherein said service start notification inquiring means inquires, when driven, of said server whether said server has issued already the service start notification to said client.

In this case, in the event that the power source is turned off after the client demands the two-way communication service to the server, when the power source is again turned on, the client inquires of the server whether the two-way communication service start notification was already issued from the server to the client himself while the power source was turned off. And if it is decided that the two-way communication service start notification was issued from the server to the client himself while the power source was turned off, the client immediately prepares for receiving the two-way communication service so that the client can receive the two-way communication service.

To attain the above-mentioned object, according to the present invention, there is provided a second client connected via a network to a server adapted for choosing a communication mode for each client between a one-way communication mode in which information is offered to clients on a one-way basis and a two-way communication mode in which messages are transmitted to clients and messages transmitted from the clients are received, said client comprising:

two-way communication service request means for requesting of said server a two-way communication service;

service start previous notice receiving means for receiving a two-way communication service start previous notice from said server; and complete preparation notification transmitting means for transmitting to said server a complete preparation notification indicative of completion of preparation for acceptance of the two-way communication service on conditions that said service start previous notice receiving means has received the two-way communication service start previous notice and preparation for acceptance of the two-way communication service has been completed.

Adoption of the second client makes it possible that even if the client is always not in the stand-by state that the two-way communication service is acceptable, the client prepares for acceptance of the two-way communication service when his turn comes.

To attain the above-mentioned object, according to the present invention, there is provided a third client connected via a network to a server adapted for choosing a communication mode for each client between a one-way communication mode in which information is offered to clients on a one-way basis and a two-way communication mode in which messages are transmitted to clients and messages transmitted from the clients are received, said client comprising:

message input means for inputting messages to the server;

input state monitoring means for monitoring an inputting state of the messages entered from said message input means; and input state informing means for informing the server of the inputting state of the messages entered from said message input means, obtained through monitoring by said input state monitoring means.

Adoption of the third client makes it possible that the server side knows the behavior of the client side, for example, such a manner that the client is intended to give the question, and thereby providing effective time distribution for clients in the event that the server answers to questions of a plurality of clients.

To attain the above-mentioned object, according to the present invention, there is provided a fourth client connected via a network to a server adapted for choosing a communication mode for each client between a one-way communication mode in which information is offered to clients on a one-way basis and a two-way communication mode in which messages are transmitted to clients and messages transmitted from the clients are received, said client comprising:

operator state informing means having a state input handler for inputting interaction possibility information indicative of whether an operator of said client is in a state that the operator is able to have an interaction with a server, said operator state informing means informs the server of the interaction possibility information entered through said state input handler.

Adoption of the fourth client makes it possible that the server side knows whether an operator of the client is in a state that the operator is able to have an interaction with the server.

BRIEF DESCRIPTION OF THE DRAWINGS

FIG. 31 is a block diagram showing a thirtieth example of a communication system.

DESCRIPTION OF THE PREFERRED EMBODIMENTS

Hereinafter, there will be described embodiments of the present invention.

Figure 1:
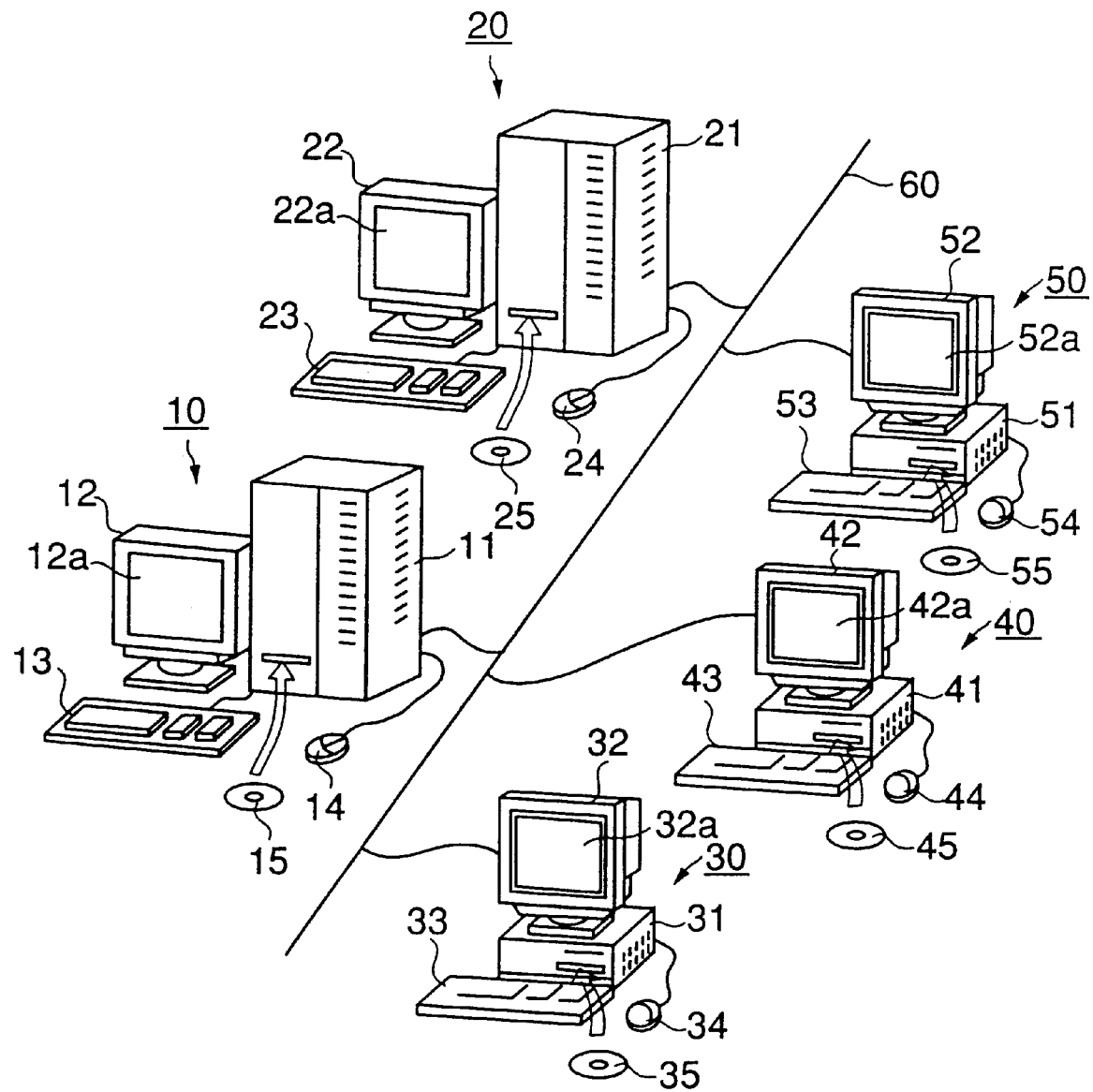
FIG. 1 is a conceptual view of a communication system including an embodiment of a server according to the present invention and an embodiment of a client according to the present invention.

FIG. 1 is a conceptual view of a communication system including an embodiment of a server according to the present invention and an embodiment of a client according to the present invention.

In FIG. 1, two servers 10 and 20 are connected through a communication network 60 to three clients 30, 40 and 50. Each of the two servers 10 and 20 and the three clients 30, 40 and 50 comprises a computer system. The associated computer systems comprise: main frame units 11, 21, 31, 41 and 51 each incorporating therein a CPU, a magnetic disk, etc.; image display units 12, 22, 32, 42 and 52 for displaying images on display screens 12a, 22a, 32a, 42a and 52a, respectively; keyboards 13, 23, 33, 43 and 53 each serving as a handler for inputting various data into the associated computer; mouses 14, 24, 34, 44 and 54 for designating optional positions on the display screens 12a, 22a, 32a, 42a and 52a, respectively to issue various instructions to the associated computers, respectively.

Magneto-optic disks (MO) 15, 25, 35, 45 and 55, which are of kind of a portable type of storage medium, are detachably mounted on the main frame units 11, 21, 31, 41 and 51, respectively. The main frame units 11, 21, 31, 41 and 51 also incorporate therein MO driving units for up loading programs and data stored in the MO 15, 25, 35, 45 and 55, and for down loading programs and data inside the main frame units 11, 21, 31, 41 and 51 onto the mounted MO 15, 25, 35, 45 and 55, respectively.

According to the present embodiment, a communication system is constructed in the form of the server/client system as shown in FIG. 1. Each of the servers 10 and 20 has a function of choosing between a one-way communication mode in which information is sent in one way to a client and a two-way communication mode in which messages are transmitted to a client and also messages transmitted from the client are received, according to the clients 30, 40 and 50. Each of the clients 30, 40 and 50 has functions of receiving information offer made in one way by the servers 10 and 20, and requesting of the servers 10 or 20 the two-way communication service and when the request is accepted, interchanging messages between it and the associated server.

Figure 2:
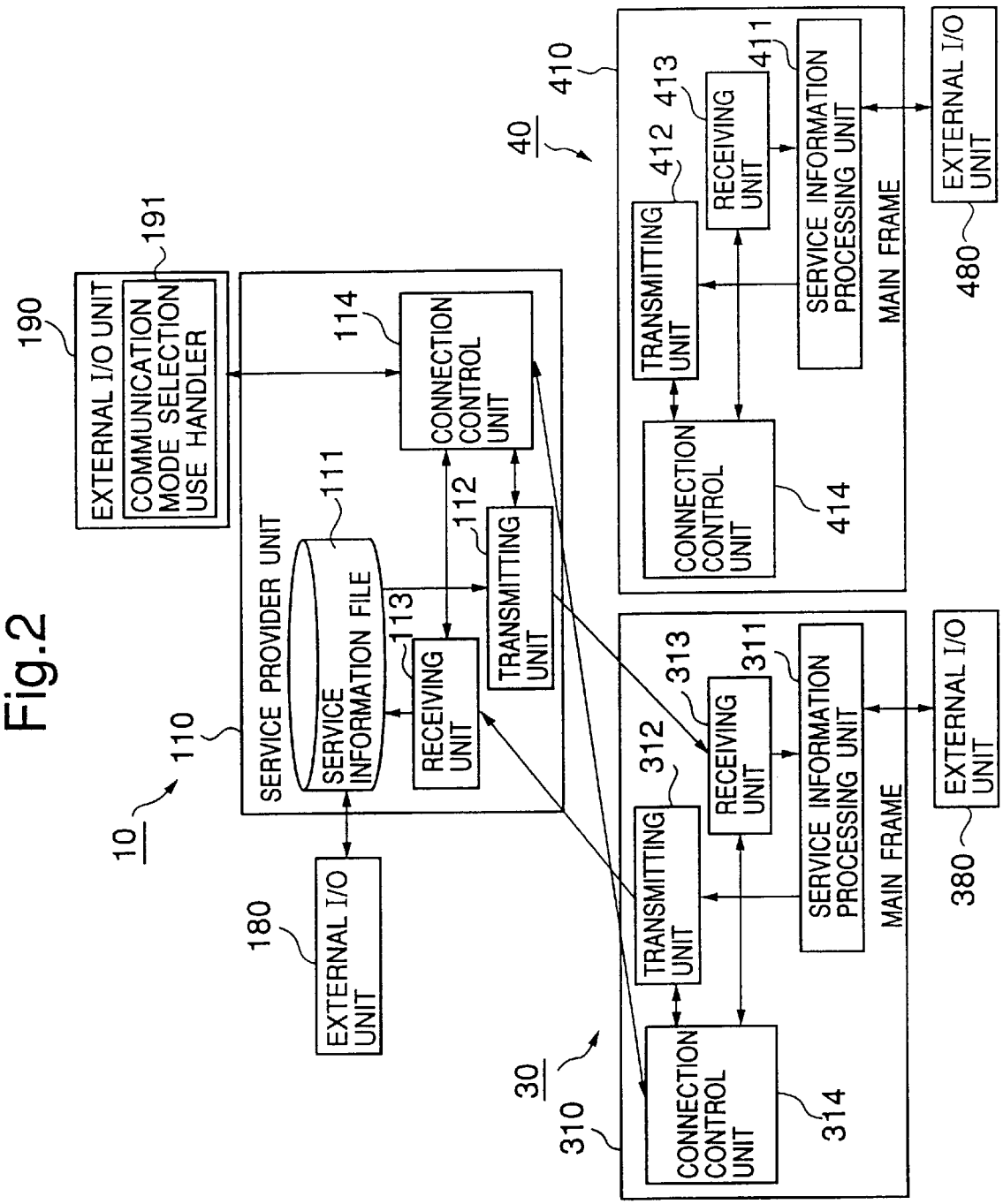
FIG. 2 is a block diagram showing a first example of a communication system.

Hereinafter, there will be explained various types of communication systems including servers and clients according to embodiments of the present invention, referring to FIG. 2 et seqq. In FIG. 2 et seqq., each server is represented by the server 10 shown in FIG. 1, and each client is represented by the client 30 shown in FIG. 1. Incidentally, in the event that a plurality of clients are shown in any of the figures, the subsequent client is represented by the client 40 shown in FIG. 1.

FIG. 2 is a block diagram showing a first example of a communication system.

A server 10 comprises a service provider unit 110, an external input and output unit 180 and an external input and output unit 190. It is to be noted that the external input and output unit 180 and the external input and output unit 190 are separated on a functional basis, and may be physically the same as each other. Specifically, the image display unit 12, the keyboard 13 and the mouses 14, which constitutes the server 10 shown in FIG. 1, correspond to the external input and output unit. The external input and output unit 180 has a communication mode selection use handler 191. The communication mode selection use handler 191 corresponds to a key to which its function is allocated, or the mouse 14 handled to click an icon on the display screen 12a.

The external input and output unit 180 serves to input and display messages to be interchanged between the server and the client, while the external input and output unit 190 serves to input control commands for a connection of a communication line between the server and the client and for an alteration of a communication mode, and to provide the associated display.

The service provider unit 110 comprises a service information file 111, a transmitting unit 112, a receiving unit 113 and a connection control unit 114.

The service information file 111 stores information to be transmitted in one way to the clients 30 and 40, messages to be interchanged between it and the clients, or messages interchanged between it and the clients. Information made up beforehand is stored in the MO 15, for example and is up-loaded into the server 10 so as to be stored in the service information file 111 for communication services for clients. The service information file 111 also stores messages inputted through the keyboard 13 or the like, which constitutes the external input and output unit 180, and transmits the same to the clients. The service information file 111 is adapted also to stores therein messages received from the clients. The messages thus stored are displayed on the display screen 12a of the image display unit 12 which constitutes the external input and output unit 180.

The transmitting unit 112 is for transmitting messages and the like to the clients. The receiving unit 113 is for receiving messages and the like transmitted from the clients. The connection control unit 114 is for receiving and transmitting control information between it and the clients to connect the transmitting unit 112 and the receiving unit 113 to the clients, or to disconnect the connection between it and the clients.

On the other hand, the clients 30 and 40 have main frame units 310 and 410 and external input and output units 380 and 480, respectively. The main frame units 310 and 410 correspond to the main frame units 31 and 41 as the hardware shown in FIG. 1, respectively. The functions of the main frame units 310 and 410 shown in FIG. 2 are constructed in the main frame units 31 and 41, respectively.

The external input and output units 380 and 480 comprise, in a similar fashion to that of the server 10, the image display units 32 and 42, the keyboards 33 and 43 and the mouses 34 and 44, respectively, which constitute the clients 30 and 40, respectively.

The main frame units 310 and 410 comprise service information processing units 311 and 411, transmitting units 312 and 412, receiving units 313 and 413, and connection control units 314 and 414, respectively.

The service information processing units 311 and 411 w receive messages inputted from the keyboards 33 and 43, etc., which constitute the external input and output units 380 and 480, respectively, and convert the received messages into ones each having a format for a communication and transmit the messages thus converted to the transmitting units 312 and 412, respectively. Further, the service information processing units 311 and 411 receive messages each having a format for a communication from the receiving units 313 and 413, and convert the received messages into ones each having a format for a display and transmit the messages thus converted to the image display units 32 and 42, respectively, which image display units 32 and 42 constitute the external input and output units 380 and 480, respectively. The image display units 32 and 42 display the messages thus obtained on the display screens 32a and 42a.

Each of the transmitting units 312 and 412 is for transmitting messages and the like directed to the server 10. Each of the receiving units 313 and 413 is for receiving messages and the like transmitted from the server 10. The connection control units 314 and 414 are for receiving and transmitting control information between those and the connection control unit 114 of the server 10 to connect the transmitting units 312 and 412 and the receiving units 313 and 413 to the server, or to disconnect the connection between those and the server, respectively.

Provided that the server 10 offers the unilateral communication service such that information is provided in one way to the client 30, the transmitting unit 112 of the server 10 and the receiving unit 313 of the client 30 are connected to each other, while the receiving unit 113 of the server 10 and the transmitting unit 312 of the client 30 are disconnected. In this condition, when an operator of the server 10 operates the communication mode selection use handler 191 of the external input and output unit 190 to input a control command so as to switch the communication mode over to the two-way communication mode such that messages can be interchanged between the server and the client. Then, the control command is fed to the connection control unit 114. Upon receipt of the control command, the connection control unit 114 informs the connection control unit 314 of the client 30 that the two-way communication is performed, and controls the receiving unit 113 of the server 10 so that it can receive messages from the client 30. On the other hand, the connection control unit 314 of the client 30 controls, upon receipt of the notification that the two-way communication is performed, the transmitting unit 312 of the client 30 so that it can transmits messages to the server 10. In this manner, the transmitting unit 312 of the client 30 is connected with the receiving unit 113 of the server 10. From the first the transmitting unit 112 of the server 10 is connected with the receiving unit 313 of the client 30. Thus, it is possible to perform the two-way communication between the server 10 and the client 30.

The server 10 is able to switch over the mode from the one-way communication service to the two-way communication service for each client.

Figure 3:
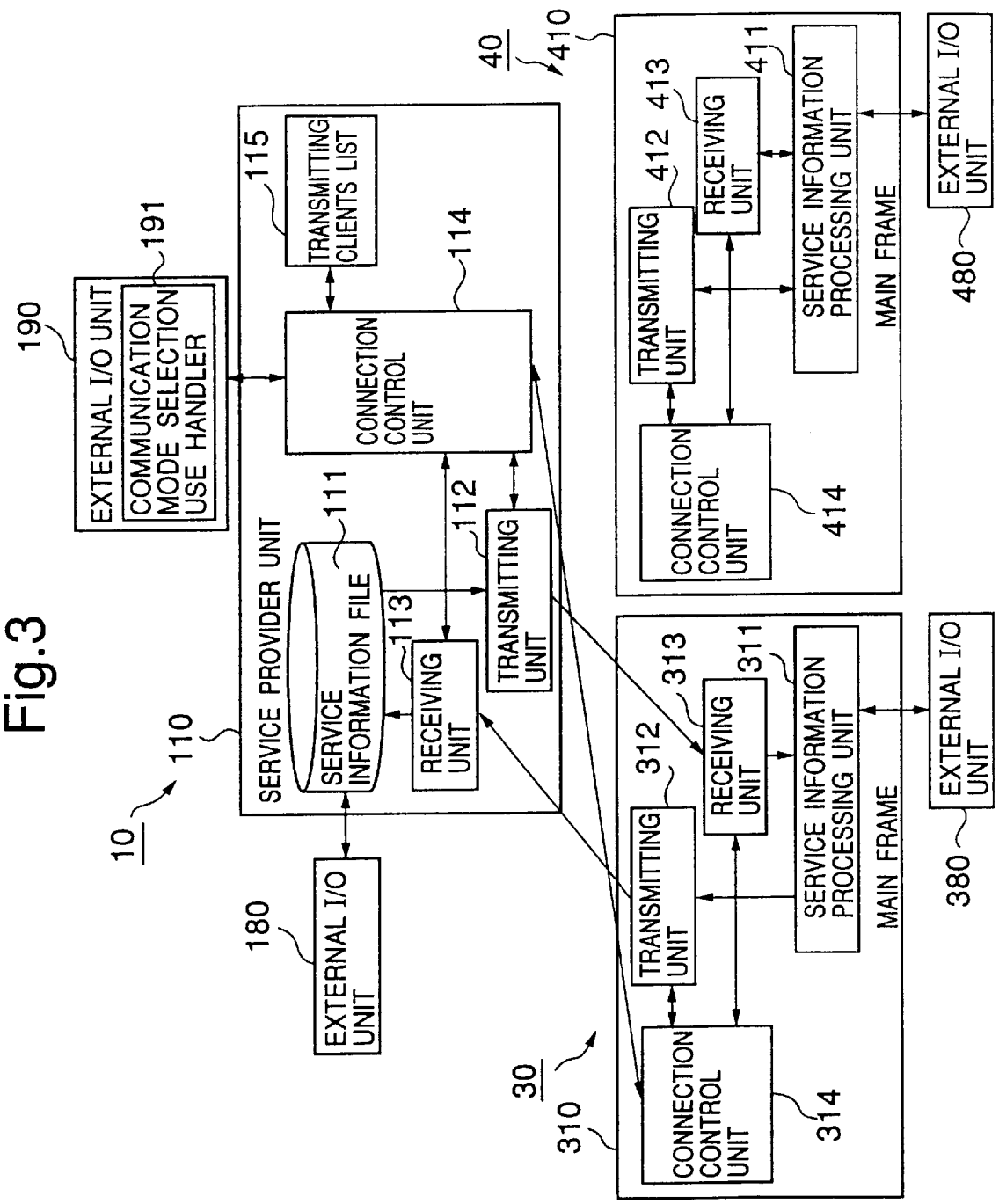
FIG. 3 is a block diagram showing a second example of a communication system.

FIG. 3 is a block diagram showing a second example of a communication system.

A difference of the second example from the first example shown in FIG. 2 resides in the point that the service provider unit 110 is provided with a transmitting clients list 115.

As described referring to FIG. 2, when a mode for a certain client is switched over from the one-way communications mode to the two-way communications mode, the client, who is changed in the mode to the two-way communications mode, is registered into the transmitting clients list 115 under control of the connection control units 314. That is, the transmitting clients list 115 is a list for clients who are qualified to transmit messages to the server.

The transmitting clients list 115 is transmitted via the connection control unit 114 to the external input and output unit 190, and is displayed on the display screen 12a of the image display units 12 shown in FIG. 1, which constitutes the external input and output unit 190. An operator of the server 10 sees the display on the display screen 12a to select a client to be terminated in the two-way communications service, and operate the communication mode selection use handler 191 to input a control command so as to switch the mode for the selected client over from the two-way communications service to the one-way communications service. Provided that the client 30 has received the two-way communications service and a control command is inputted to switch the mode for the client 30 over from the two-way communications service to the one-way communications service, the connection control unit 114 informs the connection control unit 314 of the client 30 that the mode for the client 30 is switched over to the one-way communications service, controls the receiving unit 113 so as not to receive messages from the client 30, and deletes the client 30 from the transmitting clients list 115. On the other hand, the connection control unit 314 controls the transmitting unit 312 so as not to transmit messages to the server 10. In this manner, the transmitting unit 312 of the client 30 is disconnected from the receiving unit 113 of the server 10, while the transmitting unit 112 of the server 10 is kept on being connected with the receiving unit 313 of the client 30. This means that the mode for the client 30 has been switched over to the one-way communications service in which information is provided in one way from the server 10 to the client 30.

In the server 10, it is possible for each of the clients placed on the transmitting clients list 115 to perform the above-mentioned changeover from the two-way communications service to the one-way communications service.

Figure 4:
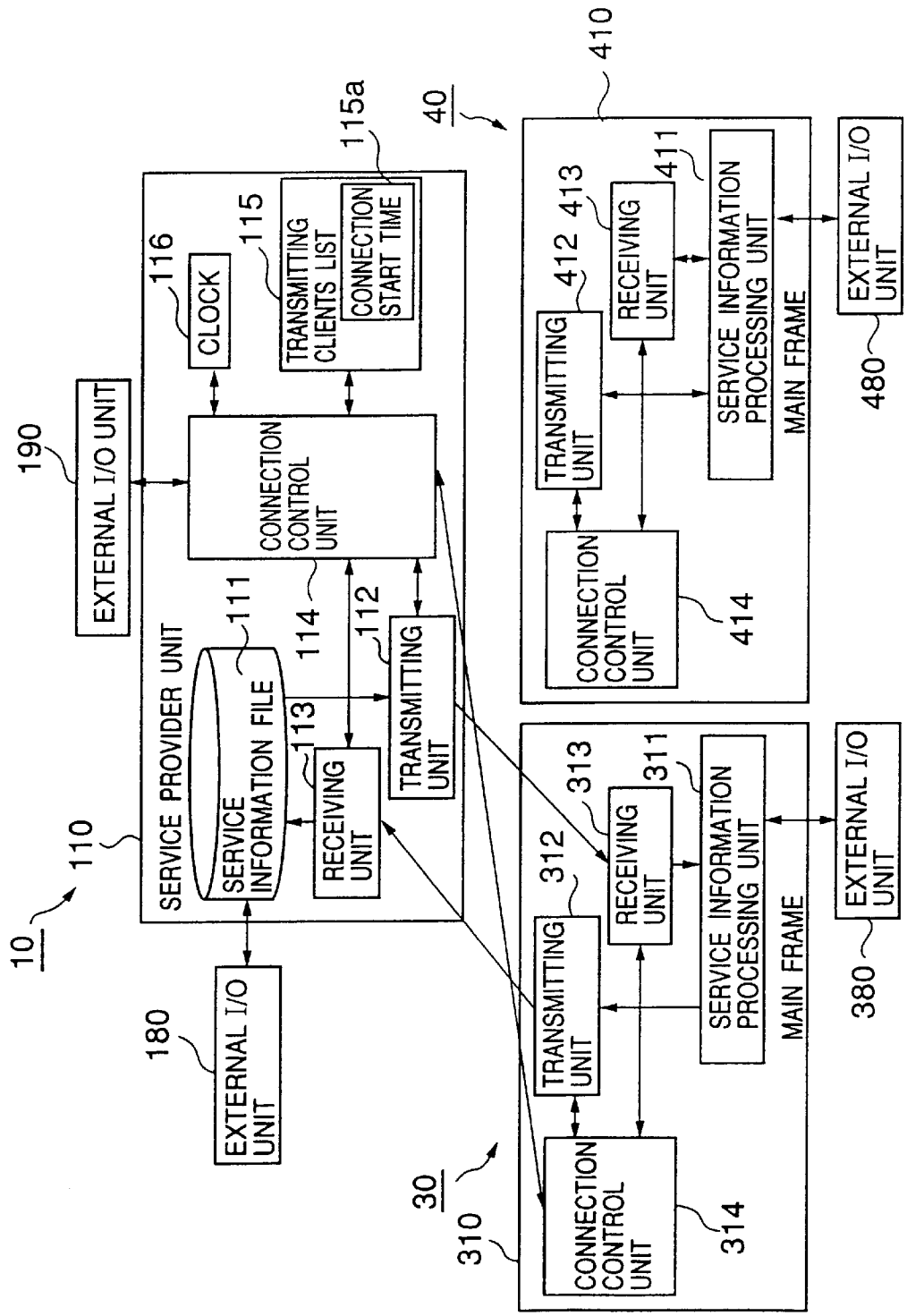
FIG. 4 is a block diagram showing a third example of a communication system.

FIG. 4 is a block diagram showing a third example of a communication system.

A difference of the third example from the second example shown in FIG. 3 resides in the points that the service provider unit 110 of the server 10 includes a clock 116 which will be referred to by the connection control unit 114, and the transmitting clients list 115 includes a connection start time 115a. The connection start time 115a indicates starting times of the two-way communications service for the respective clients placed on the transmitting clients list 115. When the mode for a certain client is switched over from the one-way communications service to the two-way communications service in the manner as explained referring to FIG. 2, this client is registered in the transmitting clients list 115 under control of the connection control unit 114, and the clock 116 is referred to so that time involved in the changeover to the two-way communications service is obtained. The time thus obtained is associated with the client registered in the transmitting clients list 115 and is stored therein.

The connection control unit 114 investigates at regular intervals times stored in the transmitting clients list 115 for each client. When the connection control unit 114 detects time involved in the lapse of a predetermined time up to this time, the connection control unit 114 provides such a control that the mode for the client associated with the detected time is switched over from the two-way communications service to the one-way communications service in the manner as explained referring to FIG. 2 but without waiting the operator's operation. This feature makes it possible to avoid such a situation that the two-way communications service is provided for a long time only for a specific client, while another client is obliged to wait for a long time.

Figure 5:
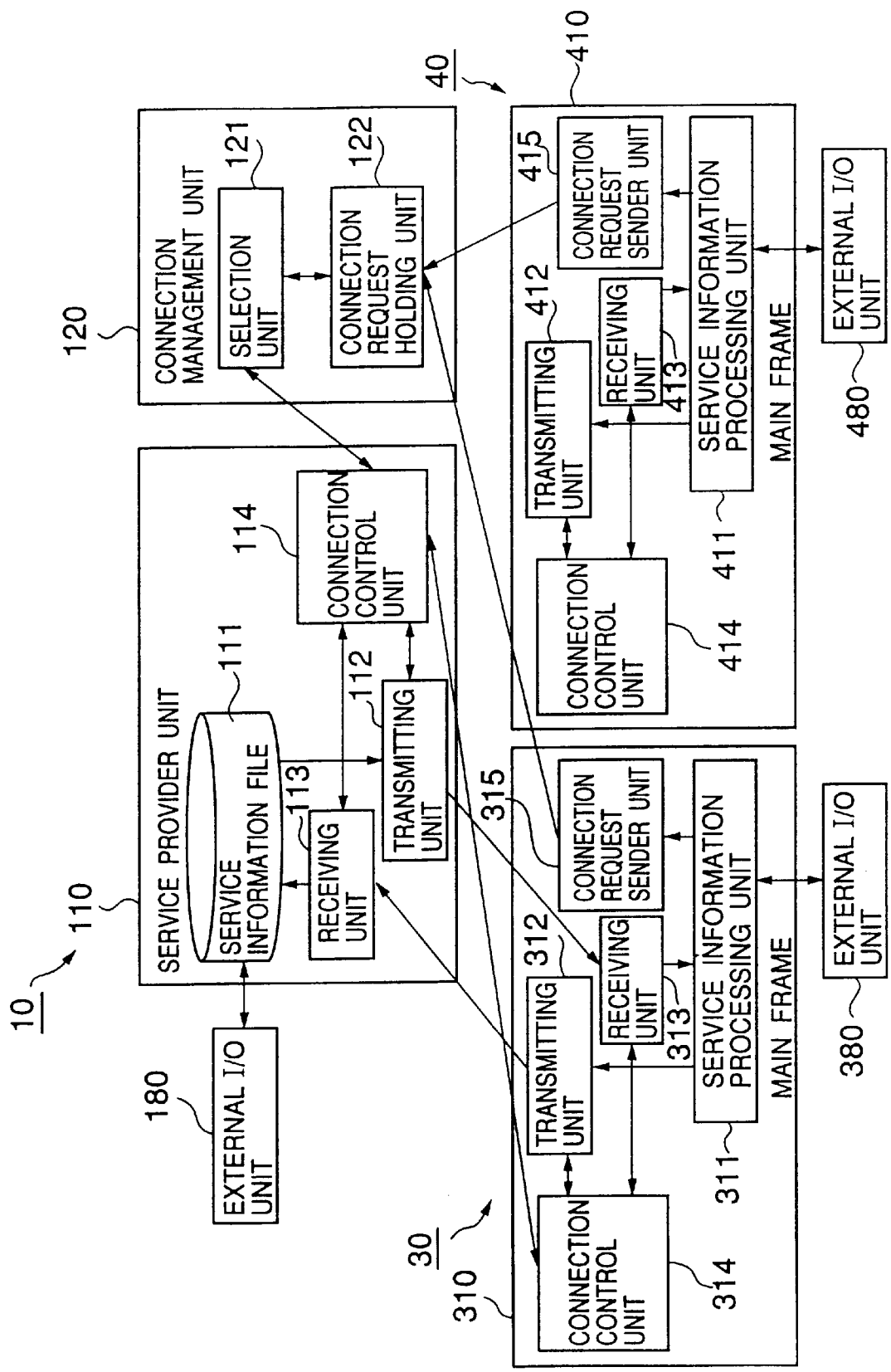
FIG. 5 is a block diagram showing a fourth example of a communication system.

FIG. 5 is a block diagram showing a fourth example of a communication system.

A difference of the fourth example from the first example shown in FIG. 3 resides in the points that the service 10 additionally includes a connection management unit 120, and the main frame units 310 and 410 of the clients 30 and 40 additionally includes connection request sender units 315 and 415, respectively.

The connection request sender units 315 and 415 serve, upon receipt of instructions from the external input and output units 380 and 480 through operations by operators of the clients 30 and 40, to send requests of the two-way communications service (two-way communications service requests) to the server 10, respectively.

The connection management unit 120 receives the two-way communications service requests transmitted from the clients 30 and 40, and holds in a connection request holding unit 122 constituting the connection management unit 120 a client ID to identify the client who requested the two-way communications service. In the event that the number of clients receiving the two-way communications service has already reached a prescribed number of regular personnel, the clients 30 and 40 may, even if they issue the two-way communications service requests, simply receive only the one-way communications service until a vacancy occurs in the two-way communications service, but are obliged to wait for the two-way communications service for some time.

When a vacancy occurs in the two-way communications service, the connection control unit 114 of the service provider unit 110 inquires of the connection management unit 120 which client the two-way communications service is provided for. Upon receipt of the inquiry issued from the connection control unit 114, a selection unit 121 constituting the connection management unit 120 selects one (e.g. client 30) of the clients held by the connection request holding unit 122 and then transfers the selected client (e.g. client 30) to the connection control unit 114.

Upon receipt of it, the connection control unit 114 performs a connection for the two-way communications service between the server 10 and the client 30 in the manner as explained referring to FIG. 2. The selection unit 121 deletes from the connection request holding unit 122 the client ID transferred to the connection control unit 114.

Figure 6:
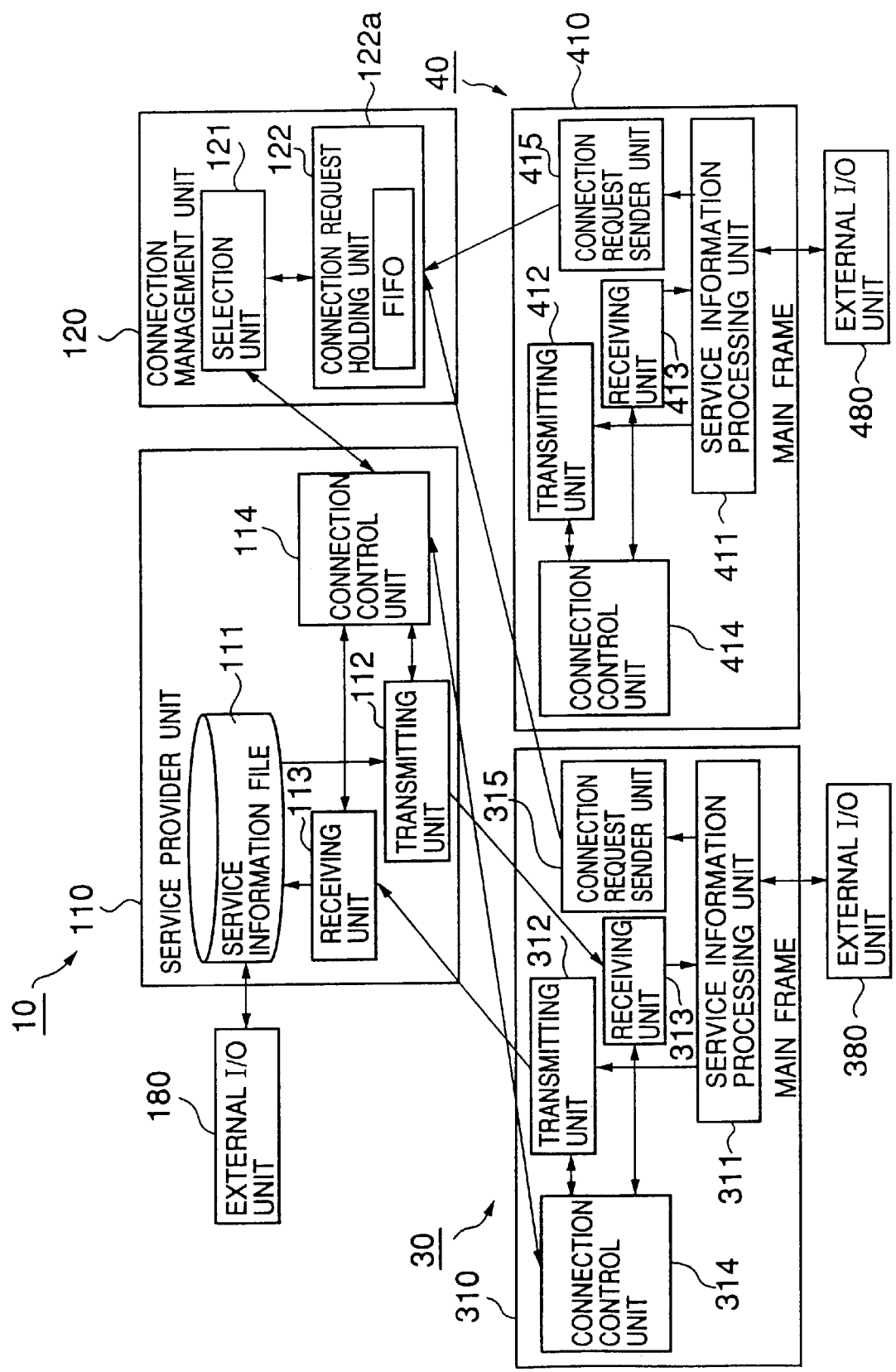
FIG. 6 is a block diagram showing a fifth example of a communication system.

FIG. 6 is a block diagram showing a fifth example of a communication system.

A difference of the fifth example from the fourth example shown in FIG. 5 resides in the points that the connection request holding unit 122 has a FIFO (First-in First-out Memory) 122a.

As explained referring to FIG. 5, when the two-way communications service request is issued from any of the clients, the connection request holding unit 122 holds a client ID of the client who issued the two-way communications service request. Further, in the event that the two-way communications service requests are issued from a plurality of clients, the FIFO 122a stores turns in receipt of the two-way communications service requests. Upon receipt of a request of introduction of a client, whom the two-way communications service is to be provided for, from the connection control unit 114, the selection unit 121 informs the connection control unit 114 of the client, who is of the first turn in receipt of the two-way communications service requests, from among the clients held in the connection request holding unit 122, and deletes the introduced client from the connection request holding unit 122. Subsequent operations are the same as those explained referring to FIGS. 5 and 2.

Figure 7:
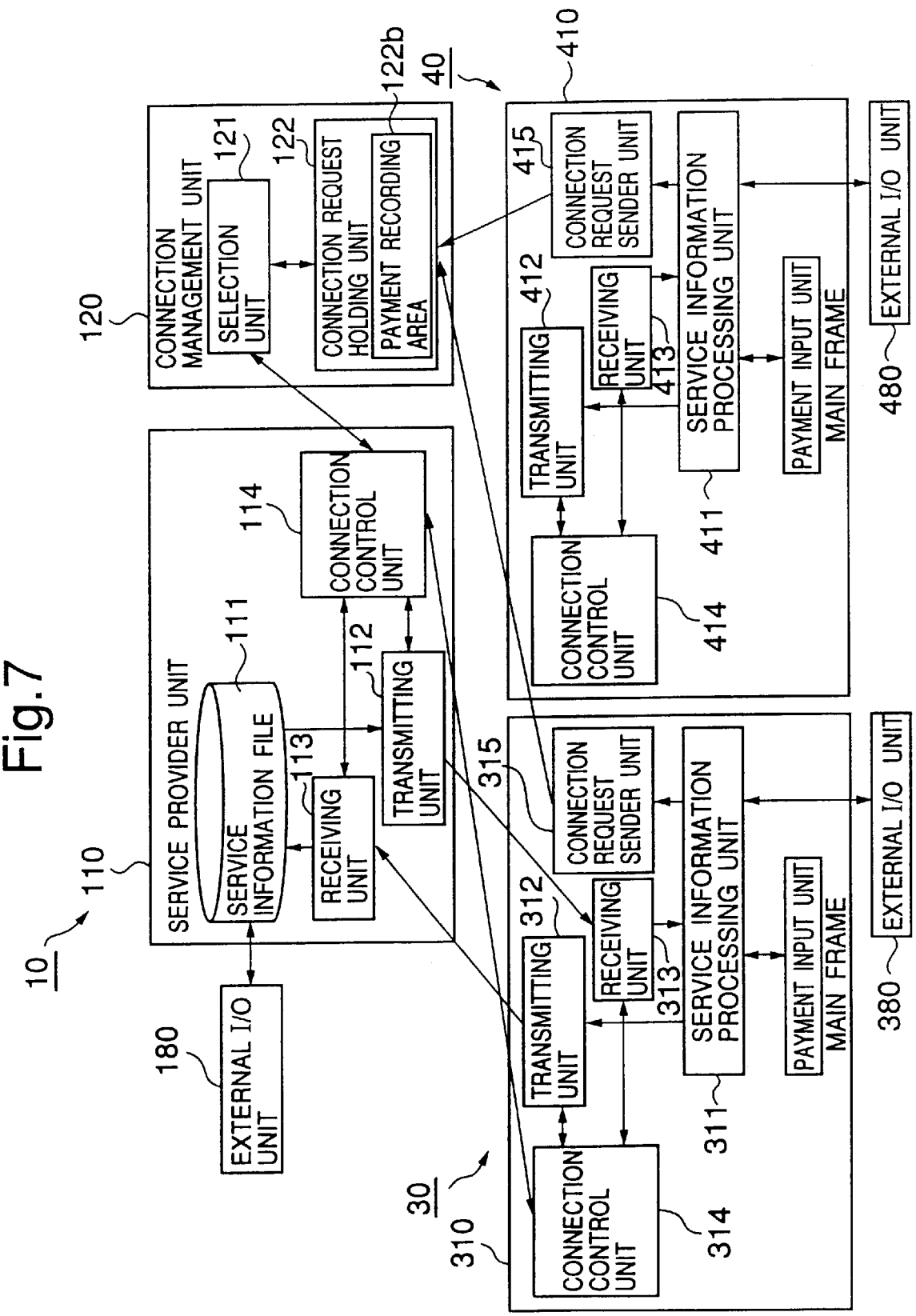
FIG. 7 is a block diagram showing a sixth example of a communication system.

FIG. 7 is a block diagram showing a sixth example of a communication system.

A difference of the sixth example from the fifth example shown in FIG. 6 resides in the points that the connection request holding unit 122 has a payment recording area 122b instead of the FIFO 122a.

In the clients 30 and 40, the connection request sender units 315 and 415 send the two-way communications service requests to the server 10 in accordance with operations of the external input and output units 380 and 480 by operators, respectively. At that time, the operator operates the external input and output units 380 to input the amount of payment for the two-way communications service. Information representative of the amount of payment is transmitted together with the two-way communications service requests from the connection request sender units 315 and 415 to the server 10. Upon receipt of the requests, the server 10 registers in the connection request holding unit 122 of the connection management unit 120 the client ID of the client requesting the two-way communications service and in addition the amount of payment. When a vacancy in the two-way communications service comes, the selection unit 121 selects, of the client IDs held in the connection request holding unit 122, a client ID of the client, whose payment is the largest one, in accordance with the request from the connection control unit 114, and informs the connection control unit 114 of the selected client ID and then deletes the client ID from the connection request holding unit 122. Subsequent operations are the same as those explained referring to FIGS. 5 and 2.

Figure 8:
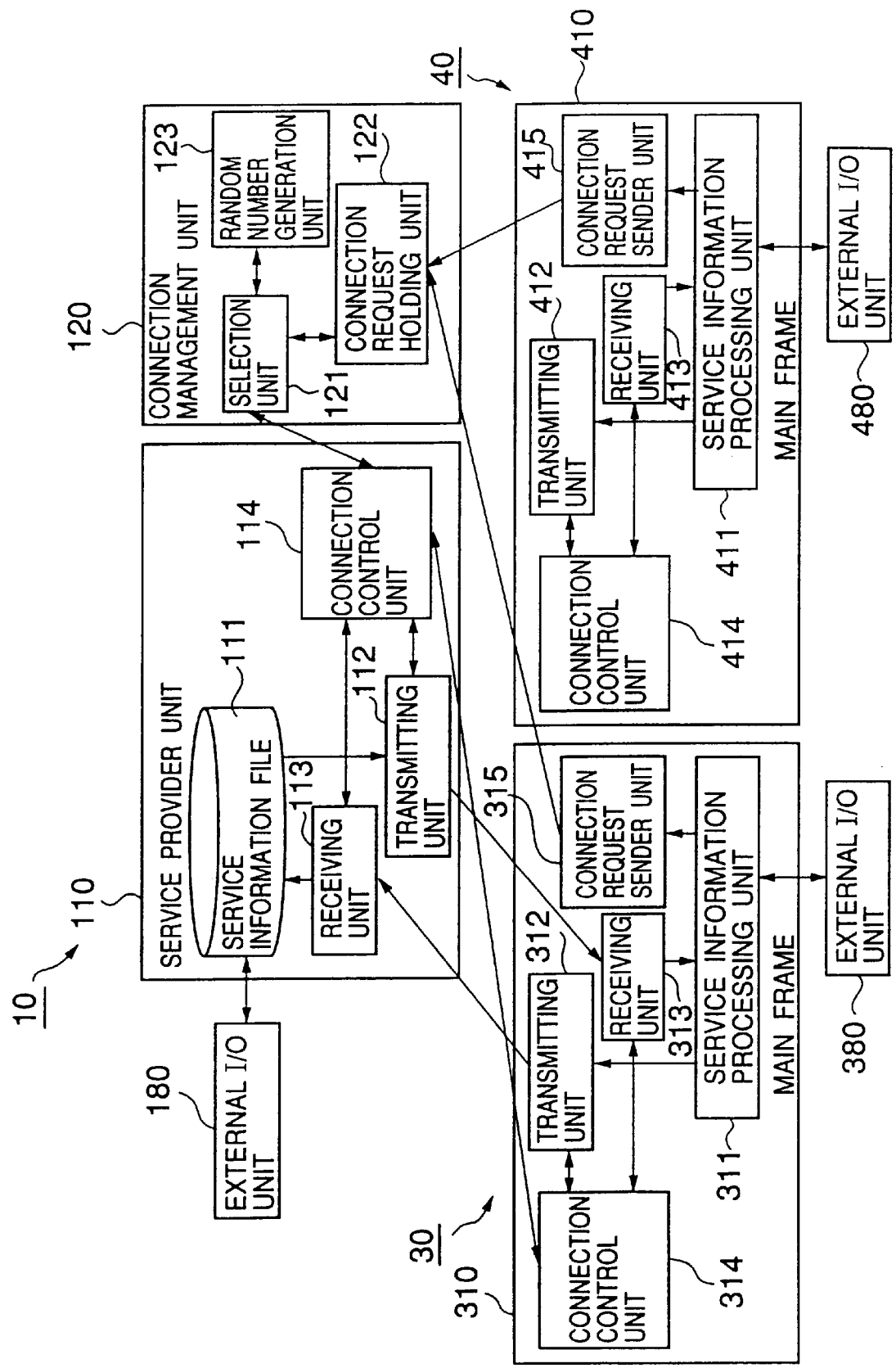
FIG. 8 is a block diagram showing a seventh example of a communication system.

FIG. 8 is a block diagram showing a seventh example of a communication system. A difference of the seventh example from the communication system shown in FIG. 5 will be explained hereinafter.

In the communication system shown in FIG. 8, as compared with the communication system shown in FIG. 5, the connection management unit 120 has additionally a random number generation unit 123.

When the selection unit 121 selects, of the clients held in the connection request holding unit 122, a single client, the selection unit 121 refers to the random number generation unit 123 so as to select the client ID associated with the number obtained from the random number generation unit 123.

In this manner, when a client, whom the two-way communications service is provided for, is selected from among the clients held in the connection request holding unit 122, some rules as mentioned above are determined. This feature makes it possible to save an operator in the server trouble for a manual selection.

Figure 9:
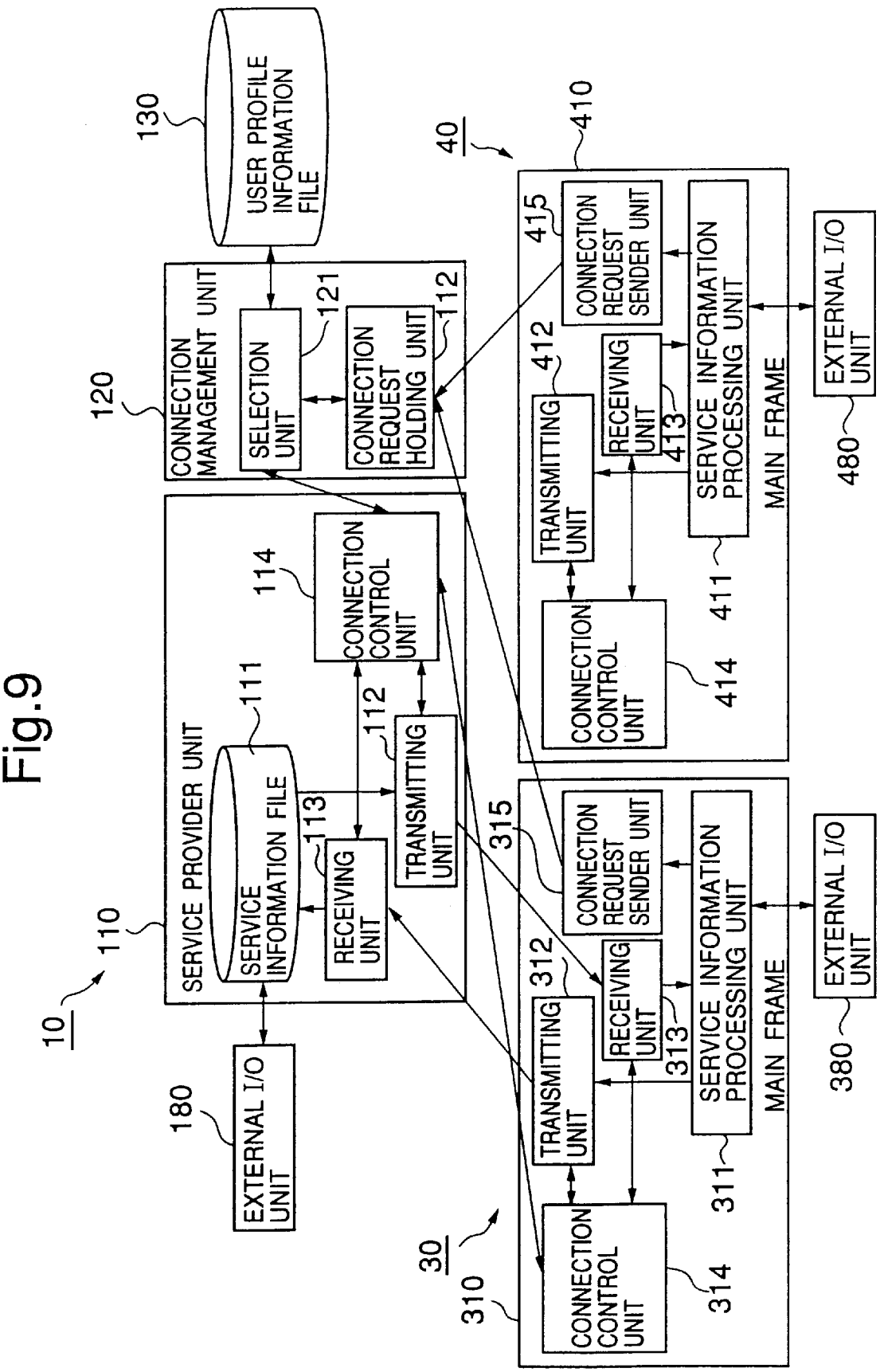
FIG. 9 is a block diagram showing an eighth example of a communication system.

FIG. 9 is a block diagram showing an eighth example of a communication system. A difference of the eighth example from the communication system shown in FIG. 5 will be explained hereinafter.

In the communication system shown in FIG. 9, as compared with the communication system shown in FIG. 5, a user profile information file 130 is added.

The user profile information file 130 stores profiles for each client as to a utilization situation for the server 10, for example, cumulative time joining the server and client system, date received the last two-way communications service, the number of times of utilization, the amount of payment, etc.

When the selection unit 121 selects, of the clients held in the connection request holding unit 122, a single client, the selection unit 121 refers to the user profile information file 130 so as to select the client, whom the two-way communications service is to be provided for, in accordance with the profiles stored in the user profile information file 130.

Figure 10:
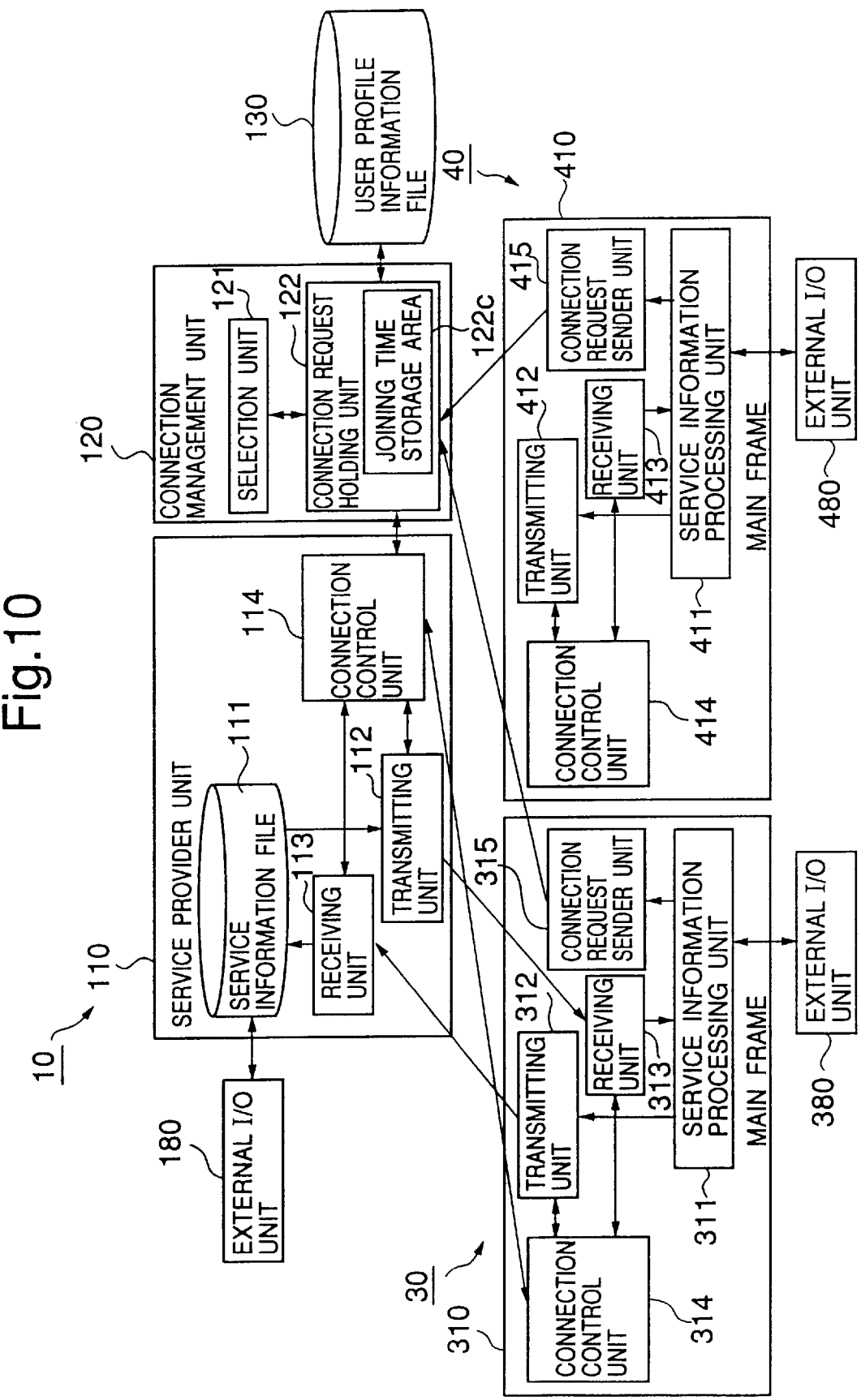
FIG. 10 is a block diagram showing a ninth example of a communication system.

FIG. 10 is a block diagram showing a ninth example of a communication system. A difference of the ninth example from the communication system shown in FIG. 9 will be explained hereinafter.

In the communication system shown in FIG. 10, as compared with the communication system shown in FIG. 9, the connection request holding unit-122 has a joining time storage area 122c.

When the connection request holding unit 122 holds a client ID of a client requested the two-way communications service, the cumulative joining time of client to the system, that is, the cumulative time of the two-way communications service for the client is read out from the user profile information file 130 to the connection request holding unit 122, so that the connection request holding unit 122 stores therein the cumulative time of the two-way communications service for the client.

When the selection unit 121 selects, from among the clients held in the connection request holding unit 122, a single client, the selection unit 121 refers to the joining time for each client, which is stored in the joining time storage area 122c, and selects the client involved in the longest joining time.

Figure 11:
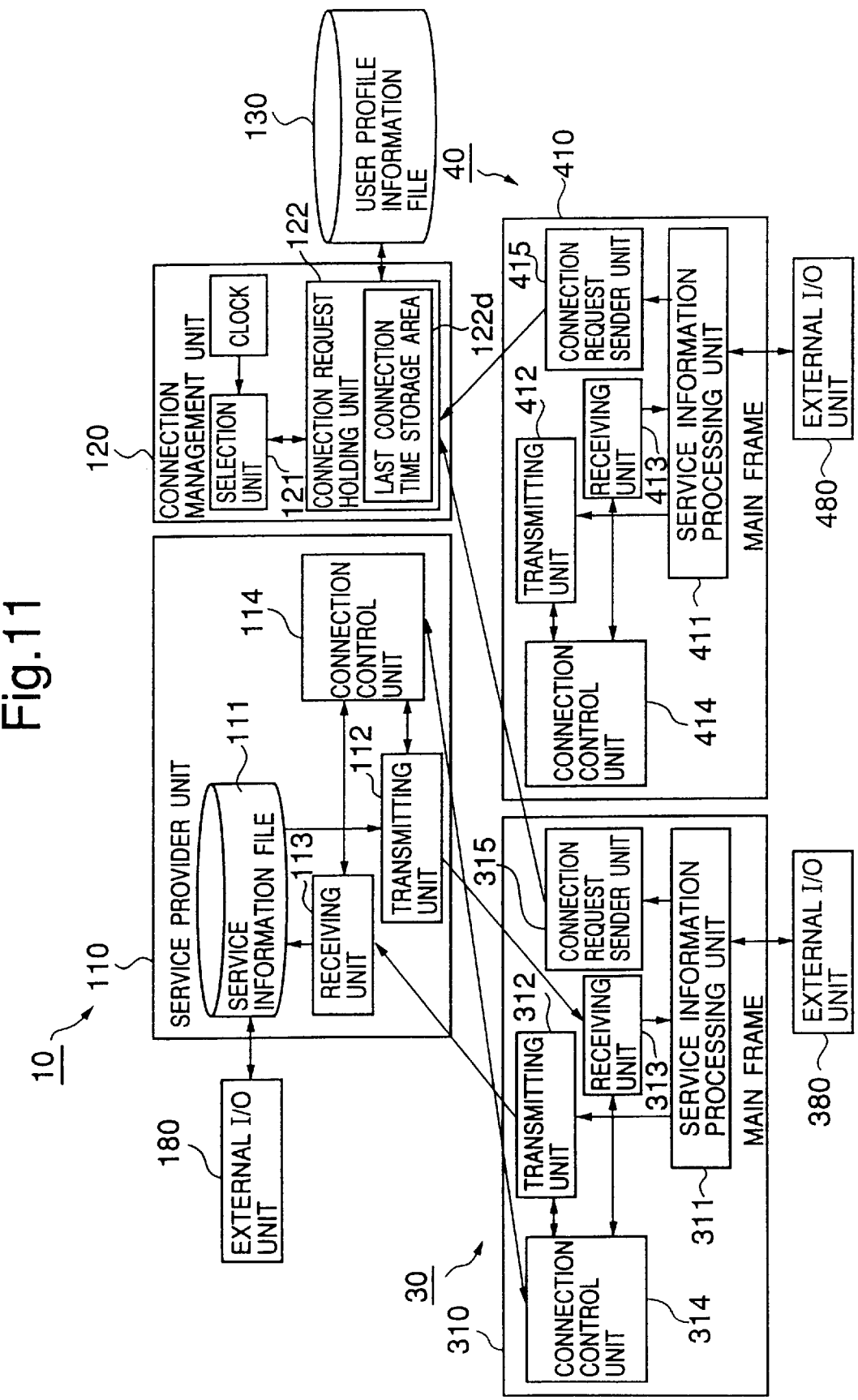
FIG. 11 is a block diagram showing a tenth example of a communication system.

FIG. 11 is a block diagram showing a tenth example of a communication system. A difference of the tenth example from the communication system shown in FIG. 10 will be explained hereinafter.

In the communication system shown in FIG. 11, as compared with the communication system shown in FIG. 10, the connection request holding unit 122 has a last connection time storage area 122d instead of the joining time storage area 122c.

When the connection request holding unit 122 holds a client ID of a client requested the two-way communications service, the time (the last connection time) at which the last two-way communications service was provided for the client is read out from the user profile information file 130 to the connection request holding unit 122, so that the connection request holding unit 122 stores therein the last connection time of the two-way communications service for the client.

When the selection unit 121 selects, from among the clients held in the connection request holding unit 122, a single client, the selection unit 121 refers to the last connection time for each client, which is stored in the last connection time storage area 122d, and selects for the two-way communications service the client involved in the oldest last connection time, that is, the client involved in the longest time elapsed from providing the last two-way communications service.

Figure 12:
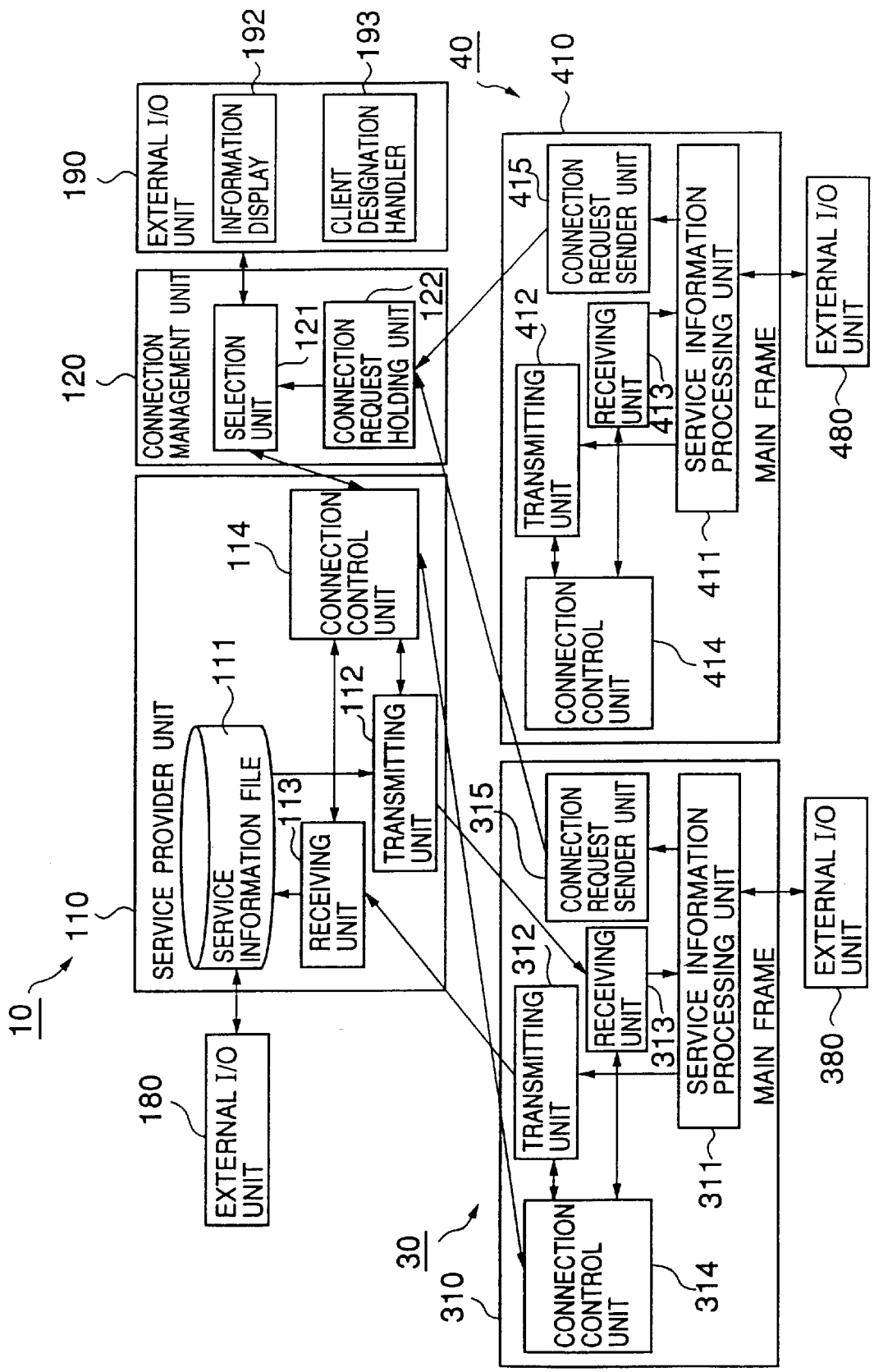
FIG. 12 is a block diagram showing an eleventh example of a communication system.

FIG. 12 is a block diagram showing an eleventh example of a communication system. A difference of the eleventh example from the communication system shown in FIG. 5 will be explained hereinafter.

The communication system shown in FIG. 12 further comprises, as compared with the communication system shown in FIG. 5, an external input and output unit 190 having a information display unit 192 and a client designation handler 193. The information display unit 192 corresponds to the image display unit 12 shown in FIG. 1. The client designation handler 193 corresponds to the keyboard 13 or the mouse 14 operated for use in designation of a client.

In the event that a plurality of clients are registered into the connection request holding unit 122, when a vacancy comes in the two-way communications service, a single client, which the two-way communications service is provided for, is selected from among the plurality of clients registered into the connection request holding unit 122. At that time, the selection unit 121 reads out a list of clients registered in the connection request holding unit 122, and transfers the list thus read out to the external input and output unit 190 so that the information display unit 192 displays the list. An operator of the server 10 looks at the list to select a client whom the two-way communications service is to be provided for, and then inputs a command to designate the client through operating the client designation handler 193. Then, the selection unit 121 informs the connection control unit 114 of the client designated by the command.

Figure 13:
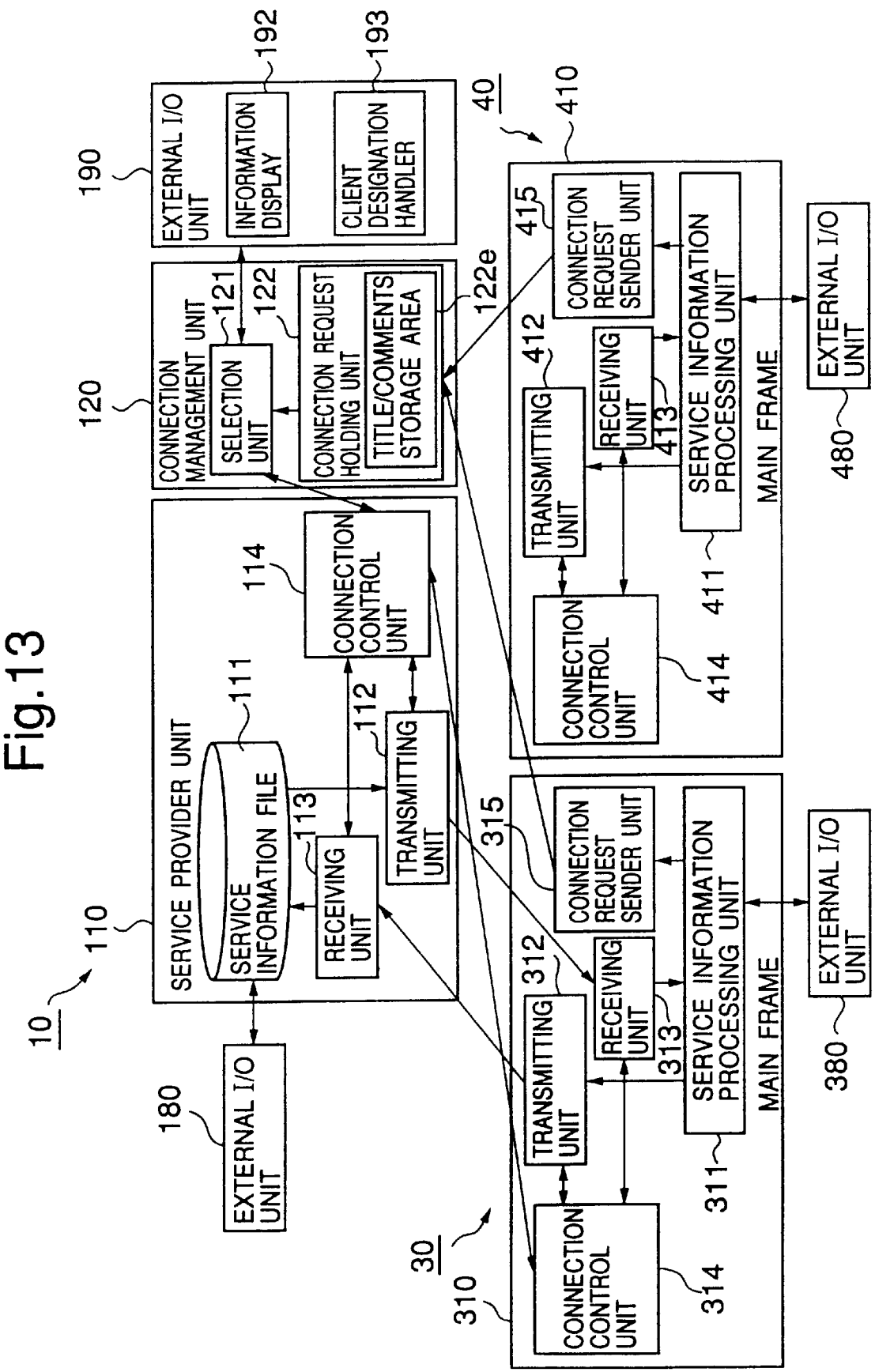
FIG. 13 is a block diagram showing a twelfth example of a communication system.

FIG. 13 is a block diagram showing a twelfth example of a communication system. A difference of the twelfth example from the communication system shown in FIG. 12 will be explained hereinafter.

In the communication system shown in FIG. 13, as compared with the communication system shown in FIG. 12, the connection request holding unit 122 has a title/comments storage area 122e.

In the clients 30 and 40, the connection request sender units 315 and 415 request of the server 10 the two-way communications service through operations of the external input and output units 380 and 480 by operators of the clients 30 and 40, respectively. At that time, the operators operate the external input and output units 380 and 480, when they received the two-way communications service, to input titles of their messages to be transmitted to the server 10, simple comments indicative of contents of the messages, etc., respectively.

Those types of information indicative of such titles, comments, etc. are transmitted together with the two-way communications service requests from the connection request sender units 315 and 415 to the server 10, respectively. Upon receipt of such information, the server 10 registers in the connection request holding unit 122 a client ID of the client requested the two-way communications service, and the title, comments, etc. transmitted together with the request from the associated client.

When a vacancy comes in the two-way communications service, the selection unit 121 reads out, upon receipt of the request of the connection control unit 114, clients, titles, comments, etc. registered in the connection request holding unit 122, and transmits those data to the external input and output unit 190 so that the information display unit 192 displays a list of the clients, titles, comments, etc. thus read out. An operator of the server 10 looks at the list, particularly, titles and comments, to select a client whom the two-way communications service is to be provided for, and then inputs a command to designate the client through operating the client designation handler 193. Then, the selection unit 121 informs the connection control unit 114 of the client designated by the command.

Figure 14:
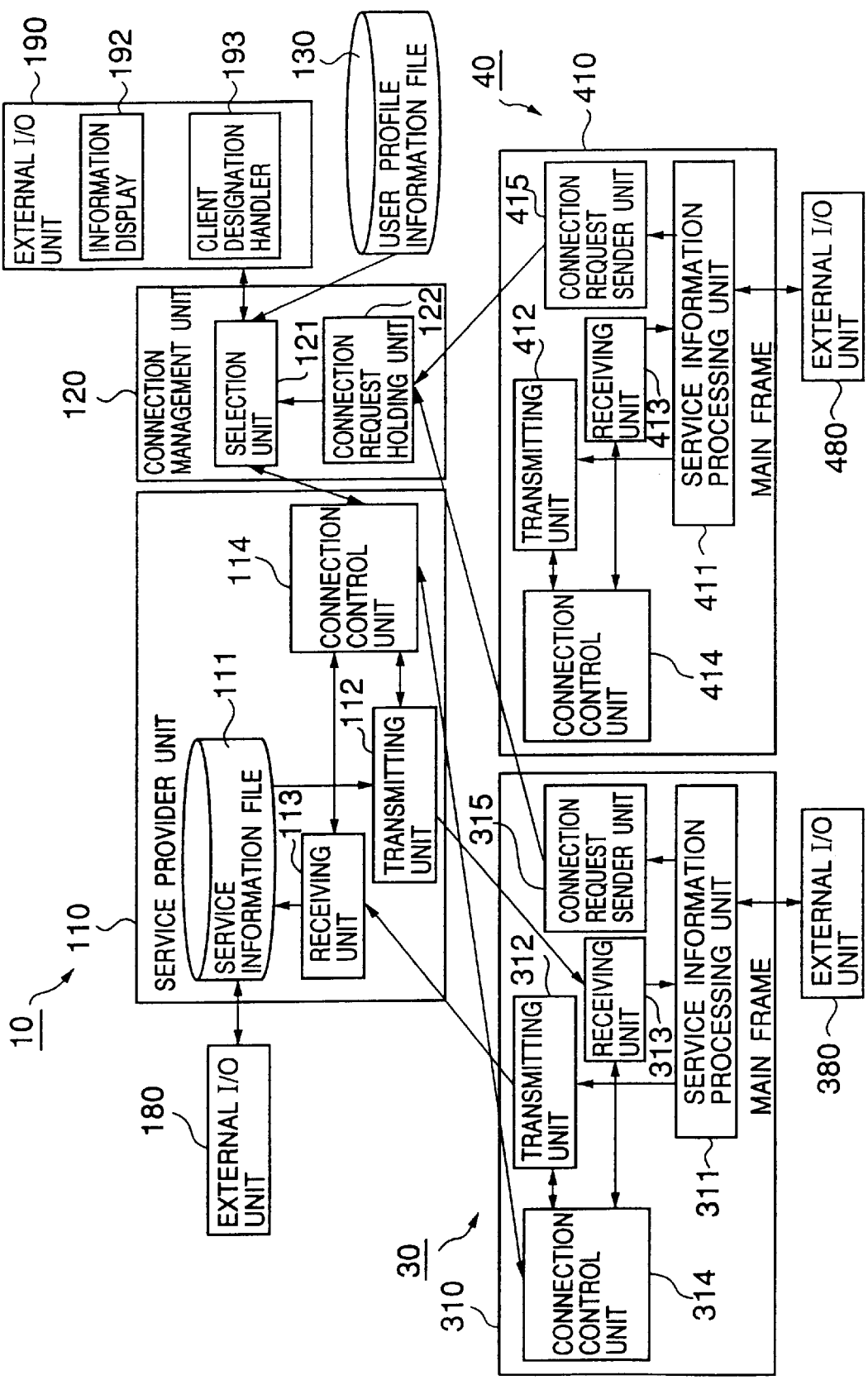
FIG. 14 is a block diagram showing a thirteenth example of a communication system.

FIG. 14 is a block diagram showing a thirteenth example of a communication system. A difference of the thirteenth example from the communication system shown in FIG. 12 will be explained hereinafter.

In the communication system shown in FIG. 14, as compared with the communication system shown in FIG. 12, a user profile information file 130 is added.

The user profile information file 130 stores profiles for each client as to a utilization situation for the server 10, for example, cumulative time for each client as to receiving the two-way communications service from the server 10, date received the last two-way communications service, the number of times of utilization, the amount of payment, etc.

When a vacancy comes in the two-way communications service, the selection unit 121 reads out, upon receipt of the request of the connection control unit 114, clients registered in the connection request holding unit 122, and in addition profiles associated with the clients, and transmits those data to the external input and output unit 190 so that the information display unit 192 displays the clients and their associated profiles thus read out.

An operator of the server 10 looks at the display to select a client whom the two-way communications service is to be provided for, and then inputs a command to designate the client through operating the client designation handler 193. Then, the selection unit 121 informs the connection control unit 114 of the client designated by the command.

According to the examples shown in FIGS. 13 and 14, it is possible to select more suitable clients desired for the operator of the server on the basis of the titles and comments, and the profiles, respectively.

Figure 15:
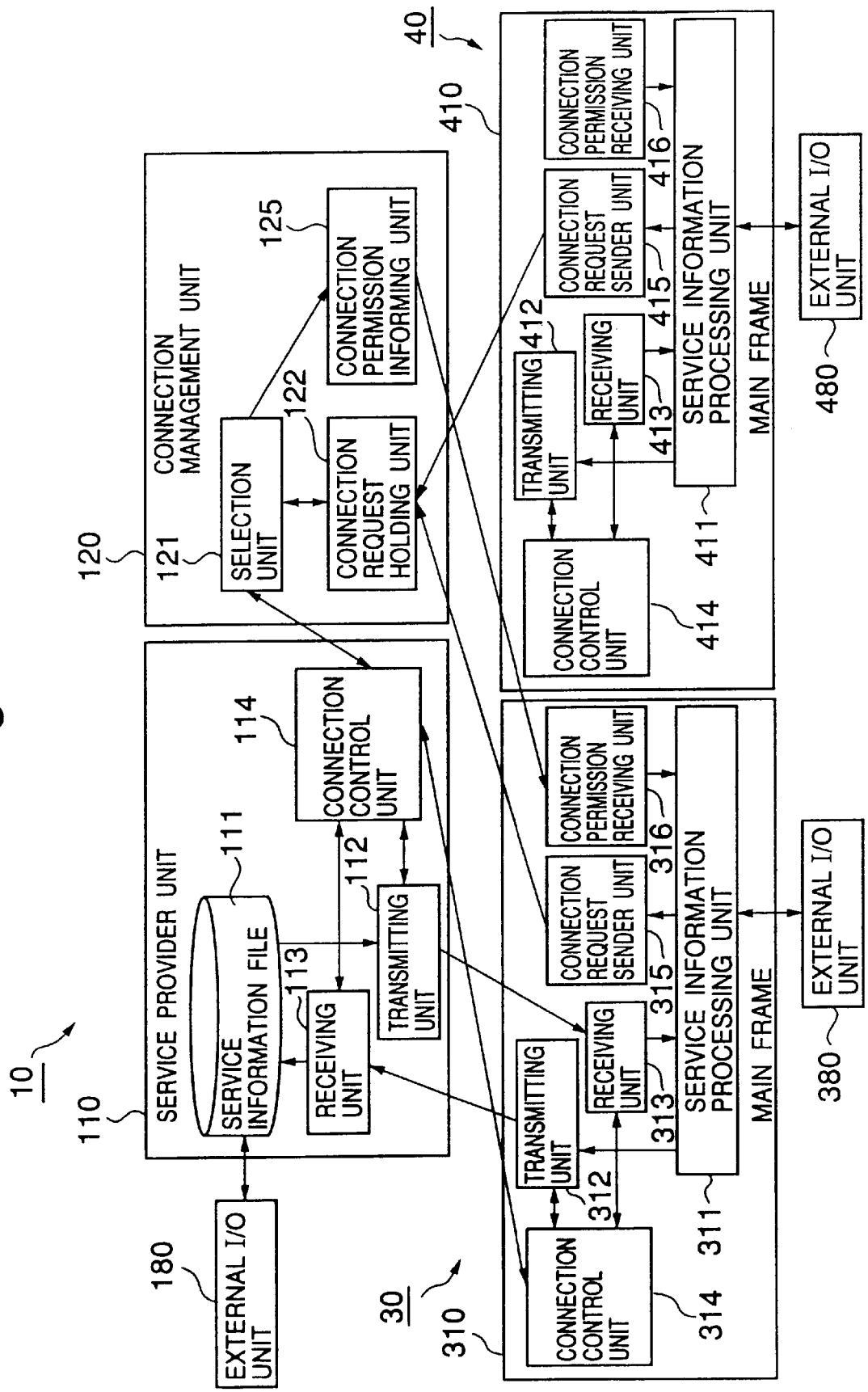
FIG. 15 is a block diagram showing a fourteenth example of a communication system.

FIG. 15 is a block diagram showing a fourteenth example of a communication system. A difference of the fourteenth example from the communication system shown in FIG. 5 will be explained hereinafter.

In the communication system shown in FIG. 15, as compared with the communication system shown in FIG. 5, a connection permission informing unit 125 is added into the server 10, and connection permission receiving units 316 and 416 are added into the clients 30 and 40, respectively.

When the selection unit 121 selects, from among the clients held in the connection request holding unit 122, a client, whom the two-way communications service is to be provided for, the selection unit 121 informs the connection permission informing unit 125 of the selected client. The connection permission informing unit 125 issues a connection permission notification indicating a notice of the start of the two-way communications service to the client (here, client 30) selected by the selection unit 121. When the client 30 receives the connection permission notification, the service information processing unit 311 of the client 30 provides such a control that it is displayed on the display screen 32a of the image display unit 32 that the two-way communications service is started.

The selection unit 121 of the server 10 informs the connection permission informing unit 125 of information for identifying the selected client and informs the connection control unit 114 as well at regular interval of the same. Subsequent connection ways for the two-way communications service are the same as those described above.

Figure 16:
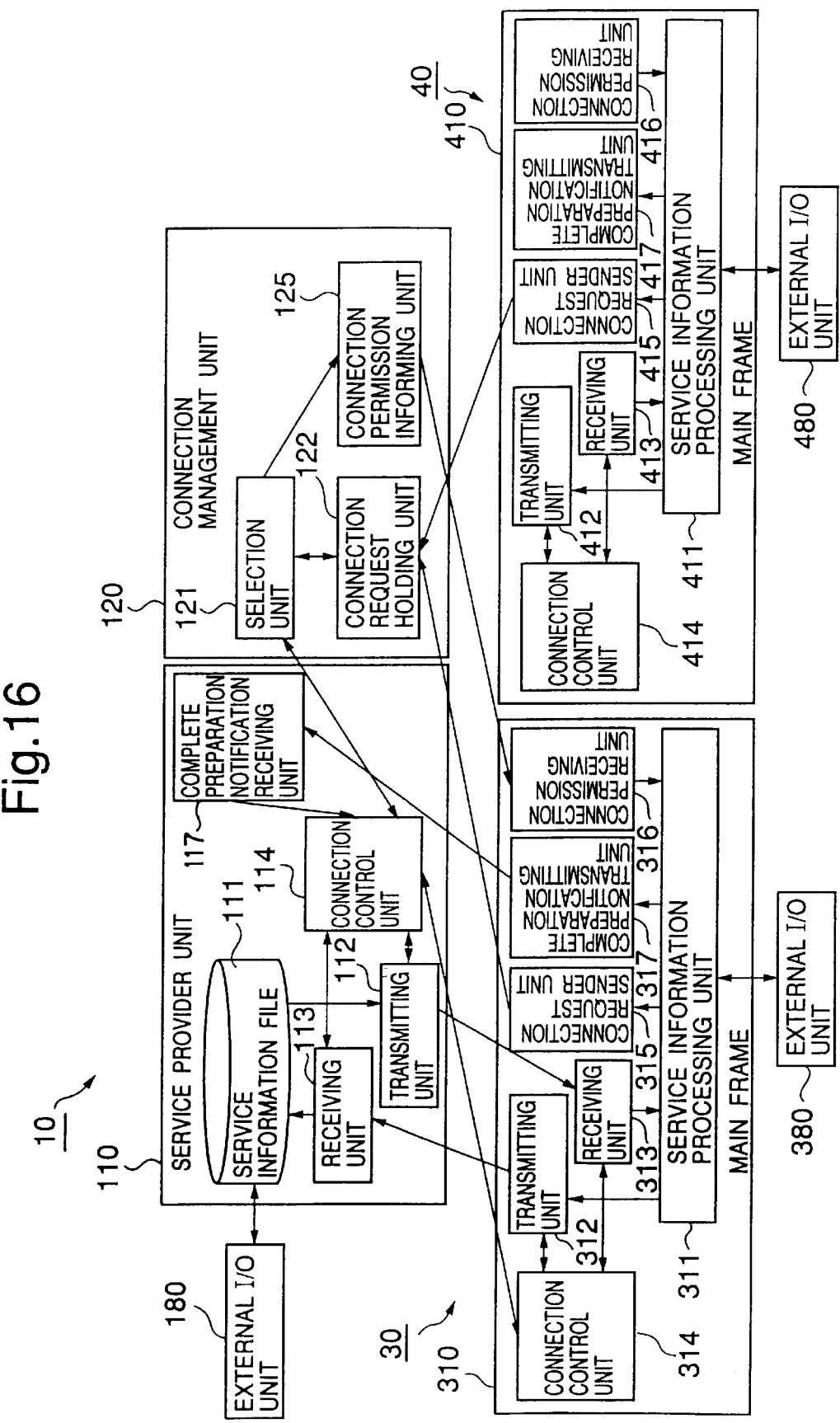
FIG. 16 is a block diagram showing a fifteenth example of a communication system.

FIG. 16 is a block diagram showing a fifteenth example of a communication system. A difference of the fifteenth example from the communication system shown in FIG. 15 will be explained hereinafter.

In the communication system shown in FIG. 16, as compared with the communication system shown in FIG. 15, a complete preparation notification receiving unit 117 is added into the server 10, and complete preparation notification transmitting units 317 and 417 are added into the clients 30 and 40, respectively.

When the client 30 receives the connection permission notification, the service information processing unit 311 of the client 30 provides such a control that it is displayed on the display screen 32a of the image display unit 32 that the two-way communications service is available. An operator of the client 30 inputs a necessary command to transmit a complete preparation notification from the complete preparation notification transmitting unit 317 to the server 10, when the client 30 is ready for receiving the two-way communications service.

When the complete preparation notification receiving unit 117 receives the complete preparation notification from the server 30, it informs the connection control unit 114 of a matter that a preparation at the client end has been completed. Upon receipt of the notification such that a preparation of the client 30 has been completed, the connection control unit 114 performs a connection for the two-way communications service between the server 10 and the client 30 in accordance with the manner as mentioned above.

In this manner, the two-way communications service is presented waiting the complete preparation notification from the client. This feature makes it possible to receive the two-way communications service after the complete preparation even if the end of the client is somewhat late in preparation.

Figure 17:
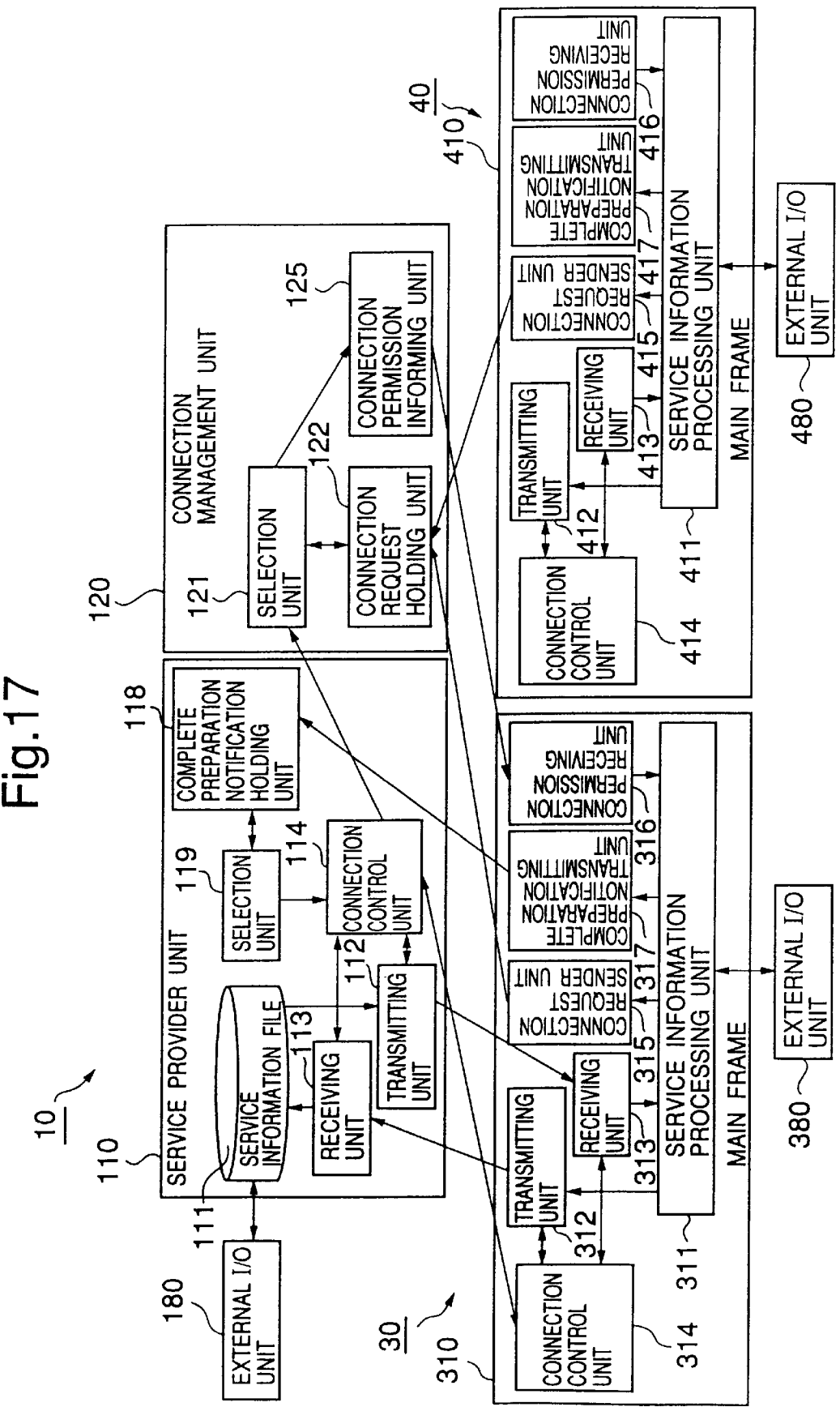
FIG. 17 is a block diagram showing a sixteenth example of a communication system.

FIG. 17 is a block diagram showing a sixteenth example of a communication system. A difference of the sixteenth example from the communication system shown in FIG. 16 will be explained hereinafter.

In the communication system shown in FIG. 17, as compared with the communication system shown in FIG. 16, a complete preparation notification holding unit 118 is prepared instead of the complete preparation notification receiving unit 117 in the communication system shown in FIG. 16, and a selection unit 119 is added.

When the client 30 is ready for receiving the two-way communications service, the complete preparation notification is transmitted from the complete preparation notification transmitting unit 317 of the client 30 to the server 10. The server 10 receives the complete preparation notification by the complete preparation notification holding unit 118 to hold a client ID for defining the client who issued the complete preparation notification. The selection unit 119 selects the client ID to be transferred to the connection control unit 114 from among the client IDs held by the complete preparation notification holding unit 118 to transfer the selected client ID to the connection control unit 114, and the client ID transferred to the connection control unit 114 is deleted from the complete preparation notification holding unit 118. The connection control unit 114 performs a connection of the communication line for the two-way communications service between the server 10 and the client indicated by the client ID received from the selection unit 119 in accordance with the manner as mentioned above.

According to the communication system shown in FIG. 17, the use of the complete preparation notification holding unit 118 and the selection unit 119 makes it possible, for example, when a plurality of vacancies come in the two-way communications service, to simultaneously select a plurality of clients with the use of the selection unit 121 of the connection management unit 120 so that the connection permission informing unit 125 issues the connection permission notifications to the plurality of clients which are simultaneously selected. When the complete preparation notifications return from the plurality of clients, those are held by the complete preparation notification holding unit 118, and are taken out one by one by the selection unit 119 and transferred to the connection control unit 114, thereby sequentially implementing a line connection for the two-way communications service for the plurality of clients who issued the complete preparation notifications. To the contrary, according to the communication system shown in FIG. 16, if the connection permission notifications are simultaneously issued to the plurality of clients, and the complete preparation notifications return from the plurality of clients, the connection control unit 114 is merely able to implement a line connection for a single client on a simultaneous basis. Consequently, a line connection for another client issued the complete preparation notification but received a minute late is not implemented. Accordingly, in case of the communication system shown in FIG. 16, even in the event that a plurality of vacancies simultaneously come, the connection permission informing unit 125 issues the connection permission notification to only a single client on a simultaneous basis, and issues the connection permission notification to the subsequent client after completion of the line connection for the last client.

Figure 18:
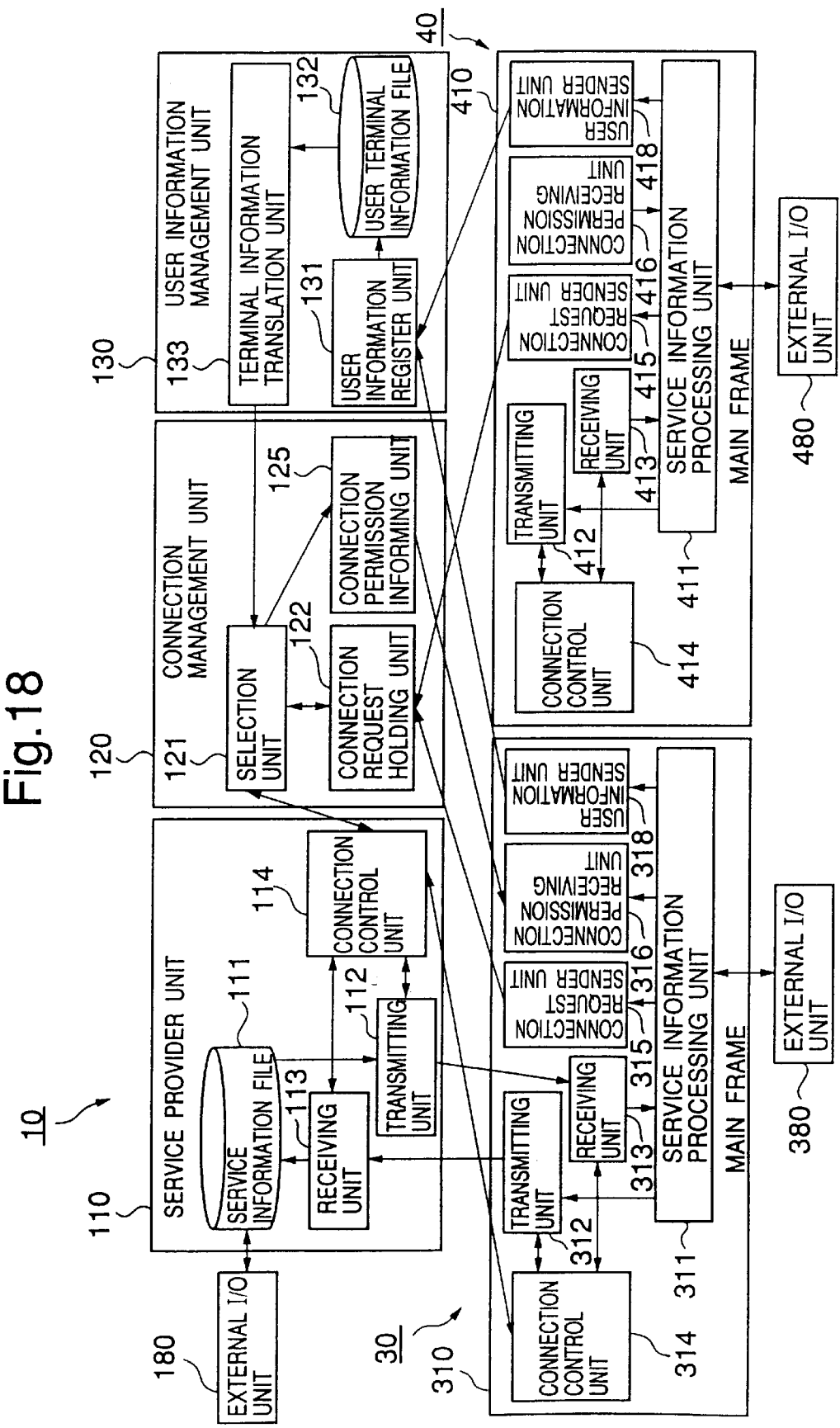
FIG. 18 is a block diagram showing a seventeenth example of a communication system.

FIG. 18 is a block diagram showing a seventeenth example of a communication system. A difference of the seventeenth example from the communication system shown in FIG. 15 will be explained hereinafter.

In the communication system shown in FIG. 18, as compared with the communication system shown in FIG. 15, a user information management unit 130 is added into the server 10, and user information sender units 318 and 418 are added into the clients 30 and 40, respectively.

The communication system shown in FIG. 18 will be explained typically referring to the client 30. When the client 30 accesses the server 10 to receive the one-way communications service from the server 10 or to request the server 10 to present the two-way communications service, the user information sender unit 318 sends to the server 10 a client ID of the client 30 and an address (IP address) of the client 30 as to the associated access. In the server 10, a user information register unit 131 receives the client ID and the IP address of the client 30, and a user terminal information file 132 registers thereinto the same.

When the access to the server 10 is terminated and the line is once disconnected, the user information register unit 131 deletes information as to the client, whose line was disconnected, from registration of the user terminal information file 132. In this manner, when the client 30 accesses again the server 10, in a similar fashion to the matter of the above, the user information sender unit 318 sends to the server 10 a client ID of the client 30 and an address (IP address) of the client 30 as to the associated access. In the server 10, the user information register unit 131 receives the client ID and the IP address of the client 30, and the user terminal information file 132 registers thereinto the same.

When the client 30 requests the two-way communications service, a client ID of the client 30 is registered into the connection request holding unit 122 of the connection management unit 120 of the server 10. When a vacancy comes in the two-way communications service and the selection unit 121 selects a client ID of the client 30 from among the client IDs held in the connection request holding unit 122, the selection unit 121 inquires of a terminal information translation unit 133 of the user information management unit 130 the present IP address of the client (here, client 30) having the client ID. The terminal information translation unit 133 refers to the user terminal information file 132 to detect an IP address of the client having the client ID, and informs the selection unit 121 of the IP address. The selection unit 121 informs the connection permission informing unit 125 and the connection control unit 114 of the IP address. The connection permission informing unit 125 sends the connection permission identification to the IP address, and the connection control unit 114 implements a line connection for the two-way communications service to the IP address.

An arrangement of the communication system shown in FIG. 18 makes it possible, even in the event that the communication system works in such a circumstance that the IP address is altered whenever the connection is made, for example, as in the dial-up circuit, to provide a suitable service without any confusion for the clients even when the circuit is disconnected and again connected.

Figure 19:
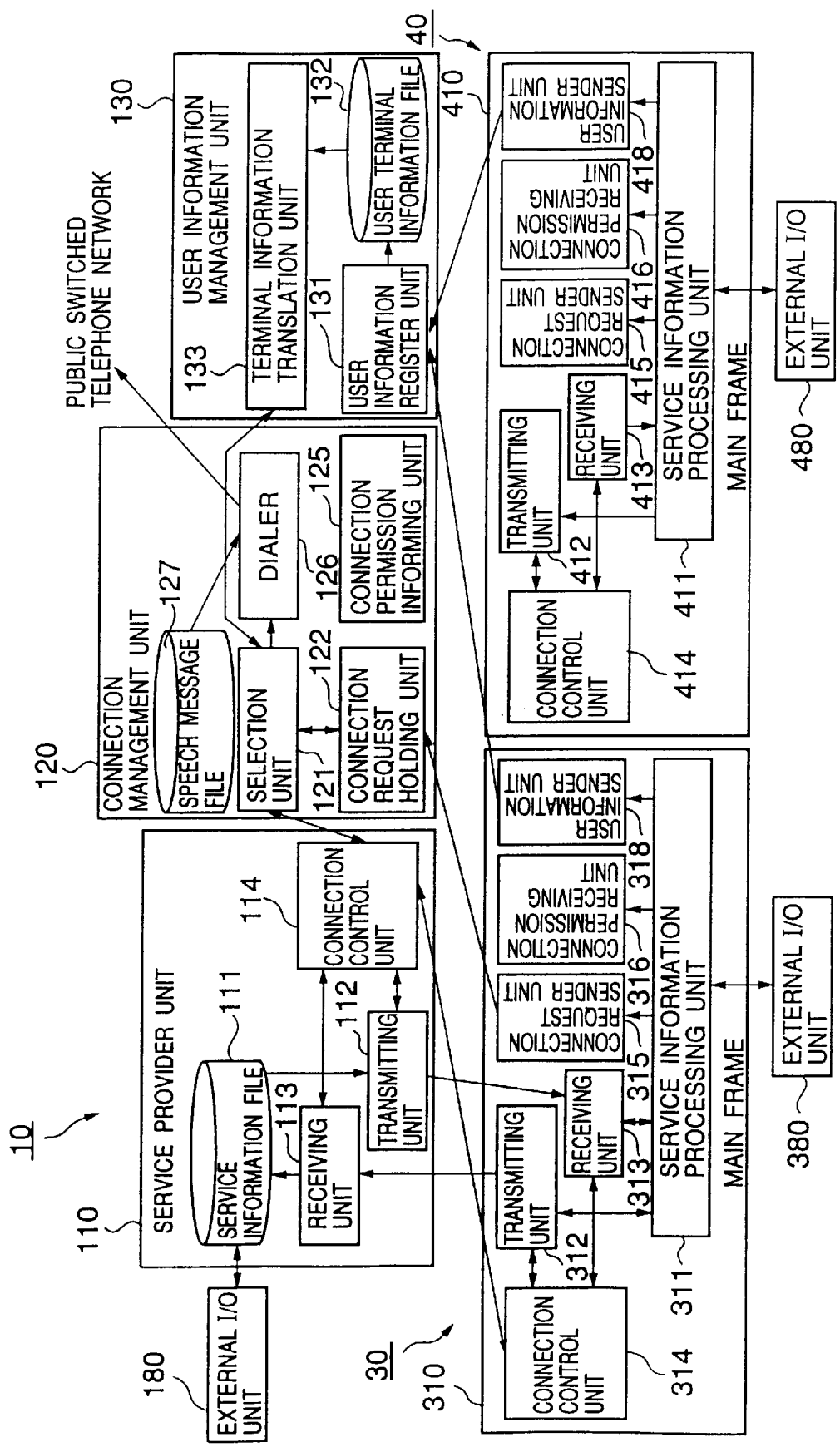
FIG. 19 is a block diagram showing an eighteenth example of a communication system.

FIG. 19 is a block diagram showing an eighteenth example of a communication system. A difference of the eighteenth example from the communication system shown in FIG. 18 will be explained hereinafter.

In the communication system shown in FIG. 19, as compared with the communication system shown in FIG. 18, the connection management unit 120 of the server 10 further comprises a dialer 126 for dialing a telephone station connected through a public switched telephone network, and a speech message file 127 for storing audio information to be transmitted to a party of dialing by the dialer 126, specifically, here, the audio information indicating that while it was intended to present the two-way communications service, the circuit is disconnected.

When the client 30 accesses the server 10, the user information sender unit 318 informs the user information management unit 130 of a client ID of the client 30, an IP address involved in the present access, and an available telephone number of the operator of the client 30, so that those types of information is registered in the user terminal information file 132.

When the access by the client 30 is terminated and the circuit is disconnected, the user information register unit 131 deletes information of the IP address associated with the client ID of the client 30 from the user terminal information file 132, but retaining the telephone number as it is.

In the event that while the terminal information translation unit 133 intended, upon receipt of the request from the selection unit 121, to detect an IP address associated with the client ID of the client, the terminal information translation unit 133 cannot be detect the IP address, in other words, the connection with the client is disconnected, the terminal information translation unit 133 detects the telephone number associated with the client ID and informs the selection unit 121 of the telephone number. The selection unit 121 informs the connection control unit 114 that the circuit between the server 10 and the client 30 is disconnected, and informs the dialer 126 of the telephone number instead of informing the connection permission informing unit 125 of the IP address. Then, the dialer 126 calls the notified telephone number. When the party answers the phone, the audio information stored in the speech message file 127 is transmitted. Thus, the operator of the client 30 is able to know that the circuit is disconnected, so that he cannot receive the two-way communications service. As the subsequent processing, for example, in the event that the circuit is reconnected within a predetermined time, it is acceptable that the two-way communications service is presented for the client 30. Alternatively, it is acceptable that the two-way communications service in the present time is cancelled, and when it is desired to receive the two-way communications service, the two-way communications service is again requested from the client 30.

Figure 20:
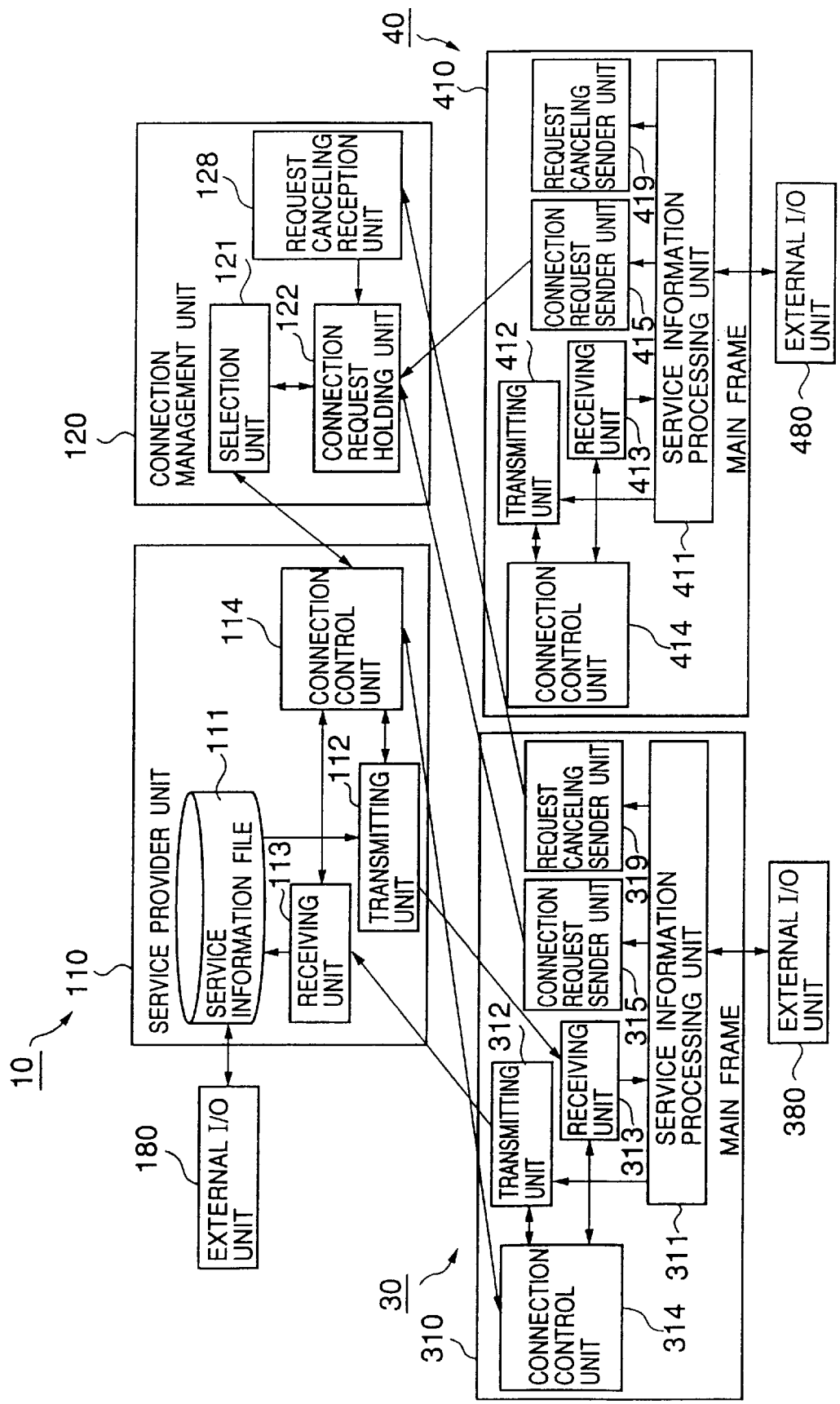
FIG. 20 is a block diagram showing a nineteenth example of a communication system.

FIG. 20 is a block diagram showing a nineteenth example of a communication system. A difference of the nineteenth example from the communication system shown in FIG. 5 will be explained hereinafter.

In the communication system shown in FIG. 20, as compared with the communication system shown in FIG. 5, the connection management unit 120 of the server 10 further comprises a request canceling reception unit 128, and the clients 30 and 40 further comprise request canceling sender units 319 and 419, respectively.

For example, in the event that while the client 30 requested of the server 10 the two-way communications service and is waiting, it is intended to cancel the two-way communications service for some reasons, an operator of the client 30 inputs a command to instruct a cancellation of the request of the two-way communications service through the external input and output unit 380. Then, the request canceling sender unit 319 issues a request of canceling of the two-way communications service to the server 10. In the server 10, the canceling request is received by the request canceling reception unit 128. Upon receipt of the canceling request, the request canceling reception unit 128 deletes a client ID of the client, who issued the canceling request, from the connection request holding unit 122.

Figure 21:
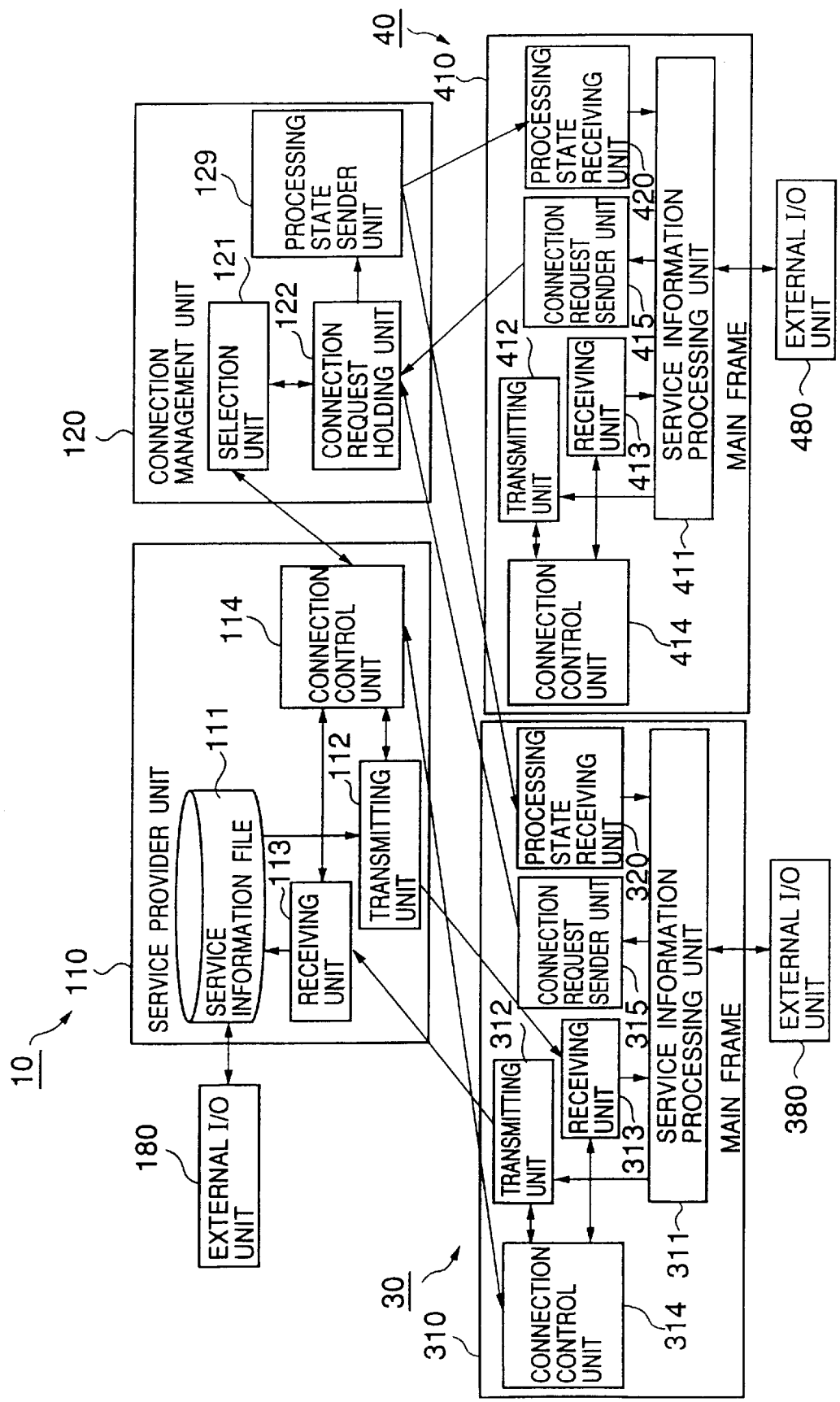
FIG. 21 is a block diagram showing a twentieth example of a communication system.

FIG. 21 is a block diagram showing a twentieth example of a communication system. A difference of the twentieth example from the communication system shown in FIG. 5 will be explained hereinafter.

In the communication system shown in FIG. 21, as compared with the communication system shown in FIG. 5, the connection management unit 120 of the server 10 further comprises a processing state sender unit 129, and the clients 30 and 40 further comprise processing state receiving units 320 and 420, respectively.

The connection request holding unit 122 of the connection management unit 120 of the server 10 has registered thereinto a client ID of the client requested the two-way communications service. The processing state sender unit 129 reads out a list of client IDs registered into the connection request holding unit-122 therefrom, and transmits the list of client IDs to the clients 30 and 40, respectively. The processing state receiving units 320 and 420 of the clients 30 and 40 receive the list of client IDs. The clients 30 and 40 may display the list of client IDs on the display screens 32a and 42a of the image display units 32 and 42 of the external input and output units 380 and 480, respectively. Operators of the clients 30 and 40 may take, when they intend to request of the server 10 the two-way communications service, such a step that they withhold their requests of the two-way communications service when a number of client IDs are displayed on the display screens.

Figure 22:
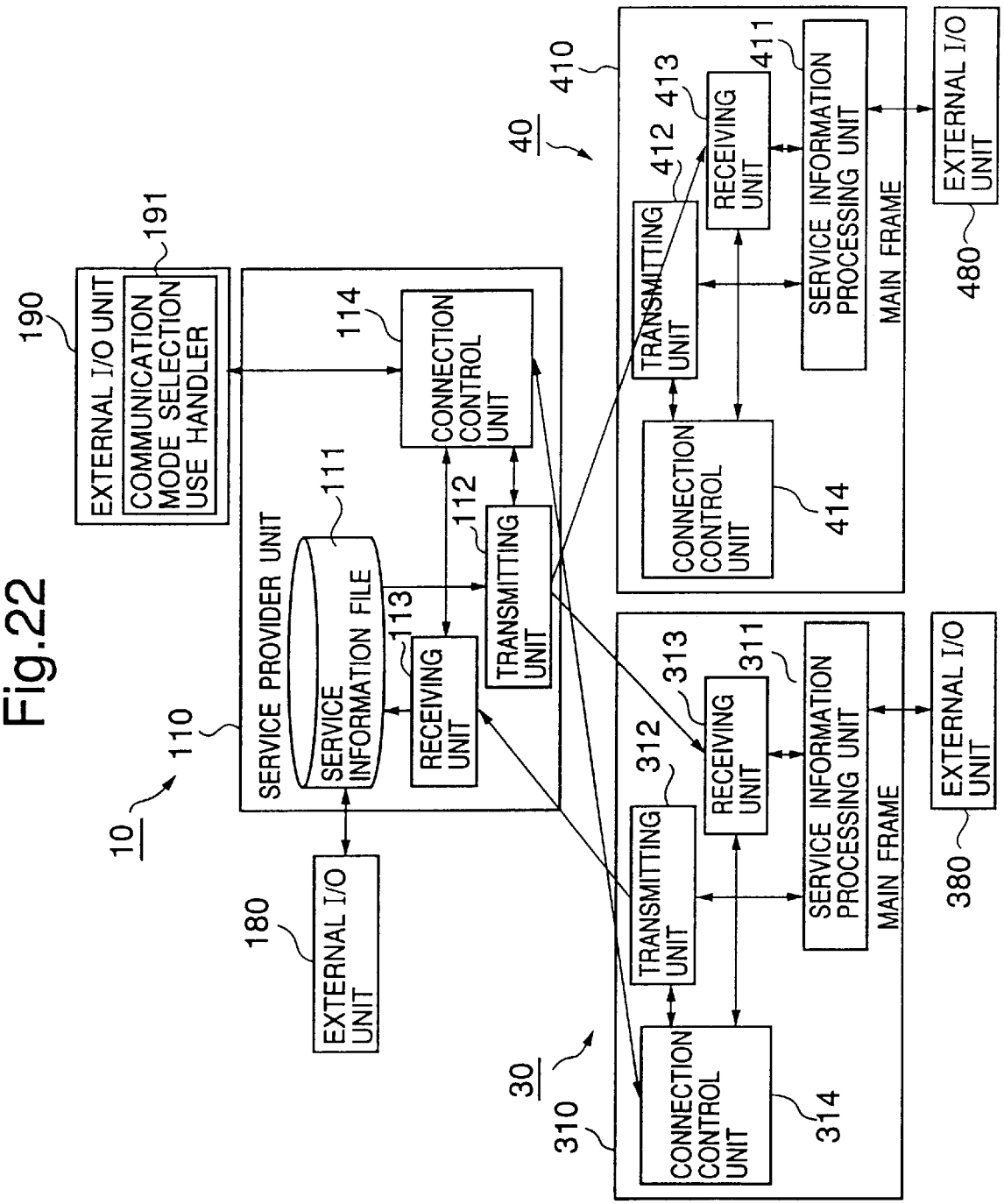
FIG. 22 is a block diagram showing a twenty-first example of a communication system.

FIG. 22 is a block diagram showing a twenty-first example of a communication system. A difference of the twenty-first example from the communication system shown in FIG. 2 will be explained hereinafter.

In the communication system shown in FIG. 22, the server 10 presents the two-way communications service and the one-way communications service to the clients 30 and 40, respectively. Under such a circumstance, information transmitted to the client 40 includes messages interchanged between the server 10 and the client 30. The reason why this is to do so is that in some cases it will be convenient for the client who cannot receive the two-way communications service to know the interactive contents between the server and another client.

Figure 23:
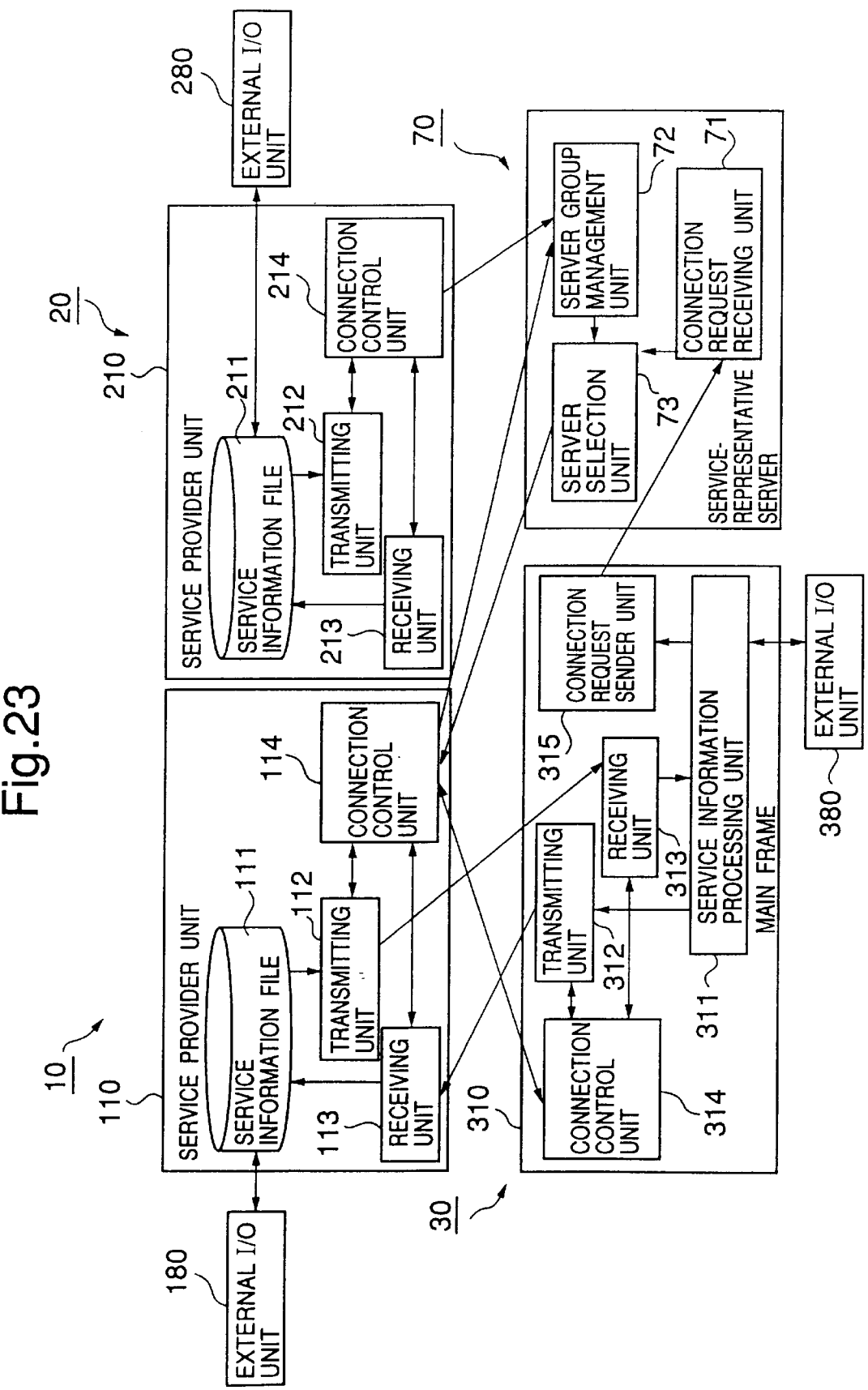
FIG. 23 is a block diagram showing a twenty-second example of a communication system.

FIG. 23 is a block diagram showing a twenty-second example of a communication system.

The communication system shown in FIG. 23 comprises two servers 10 and 20, a single client 30, and a service-representative server 70. An aggregate of the two servers 10 and 20 and the service-representative server 70 looks like a single server for the client 30.

The structure of the server 20 is the same as the server 10. The server 20 comprises a service provider unit 210 and an external input and output unit 280. The service provider unit 210 comprises a service information file 211, a transmitting unit 212, a receiving unit 213 and a connection control unit 214. The service-representative server 70 comprises a connection request receiving unit 71, a server group management unit 72 and a server selection unit 73.

When the client 30 issues a two-way communications service request, that request is received by the connection request receiving unit 71 of the service-representative server 70. Upon receipt of the request from the client 30, the connection request receiving unit 71 informs the server selection unit 73 of an attribute (for example, a communication mode, a communication rate, etc.) of the client made the request, and requests the server selection unit 73 to select a suitable server meeting the attribute of the client. The server group management unit 72 manages attributes and the like of a plurality of servers 10 and 20 which are under the control of the service-representative server 70. The server selection unit 73 selects, upon receipt of the request from the connection request receiving unit 71, a suitable server (here, e.g. the server 10) is selected from among a plurality of servers registered into the server group management unit 72, and provides the connection control unit 114 of the selected server 10 information as to the client made the request of the two-way communications service to request the two-way communications service for the client. Thus, the connection control unit 114 performs a circuit connection for the two-way communications service between it and the server.

Figure 24:
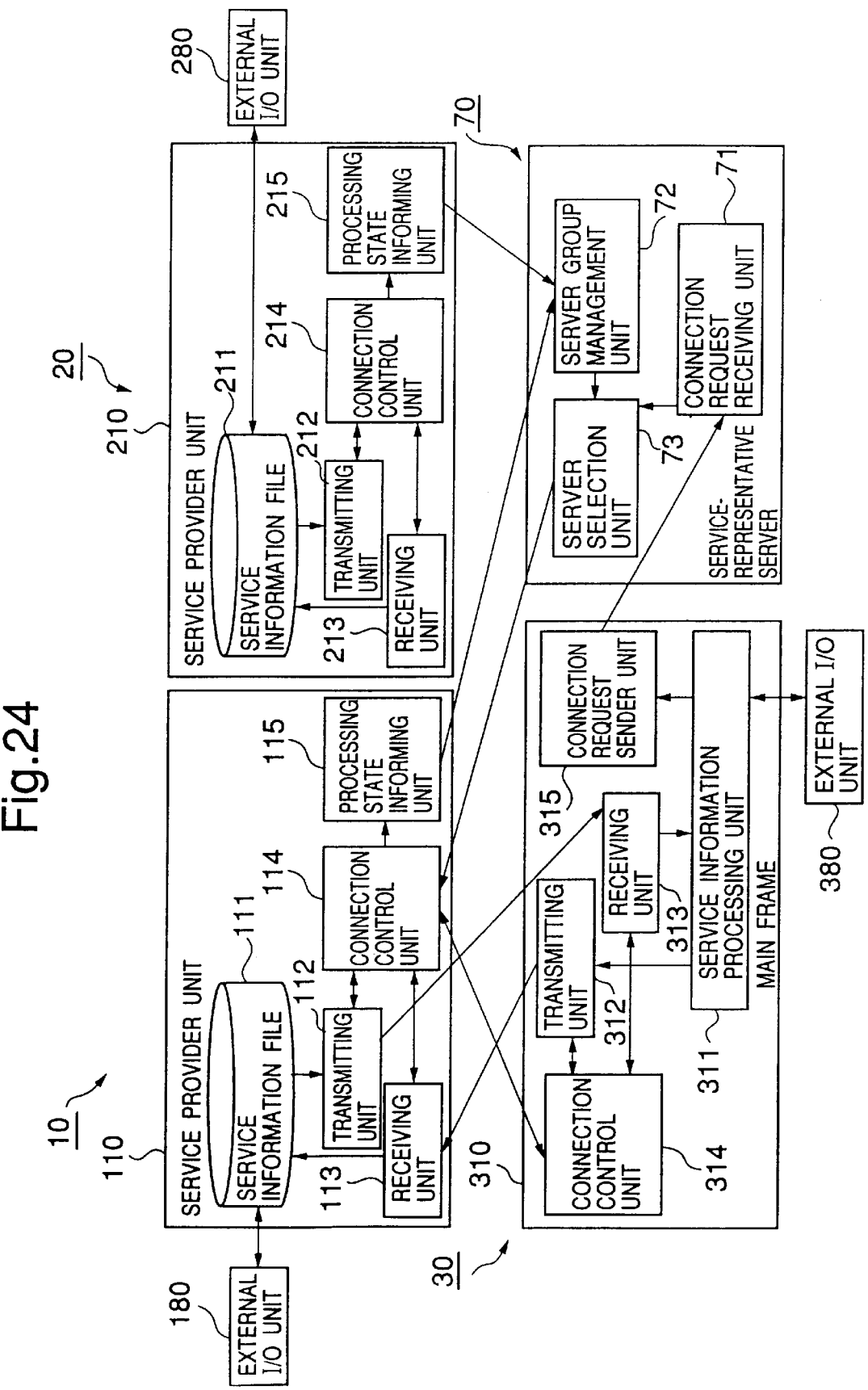
FIG. 24 is a block diagram showing a twenty-third example of a communication system.

FIG. 24 is a block diagram showing a twenty-third example of a communication system. A difference of the twenty-third example from the communication system shown in FIG. 23 will be explained hereinafter.

In the communication system shown in FIG. 24, as compared with the communication system shown in FIG. 23, the servers 10 and 20 further comprise processing state informing units 115 and 215, respectively. The processing state informing units 115 and 215 of the servers 10 and 20 obtain from the connection control units 114 and 214 information as to loading states of the servers 10 and 20, that is, the number of clients who are now providing the two-way communications service, respectively, and transmit such information to the server group management unit 72 of the service-representative server 70.

When a request of the two-way communications service is made from a client, the server selection unit 73 obtains loading states of the servers 10 and 20 from the server group management unit 72, and requests of a server involved in the lightest load that the server provides the two-way communications service for the client.

Constitution of the system having such a server as the aggregate makes it possible to avoid such an inconvenience that while some server is idle, another server is busy, thereby providing an even share for a plurality of servers 10 and 20 and also improving the service for the clients.

Incidentally, according to the systems shown in FIGS. 23 and 24, while the service-representative server 70 serves simply to distribute the requests from the clients, it is acceptable that the service-representative server 70 serves not only to distribute the requests from the clients, but also to present the two-way communications service by itself.

Figure 25:
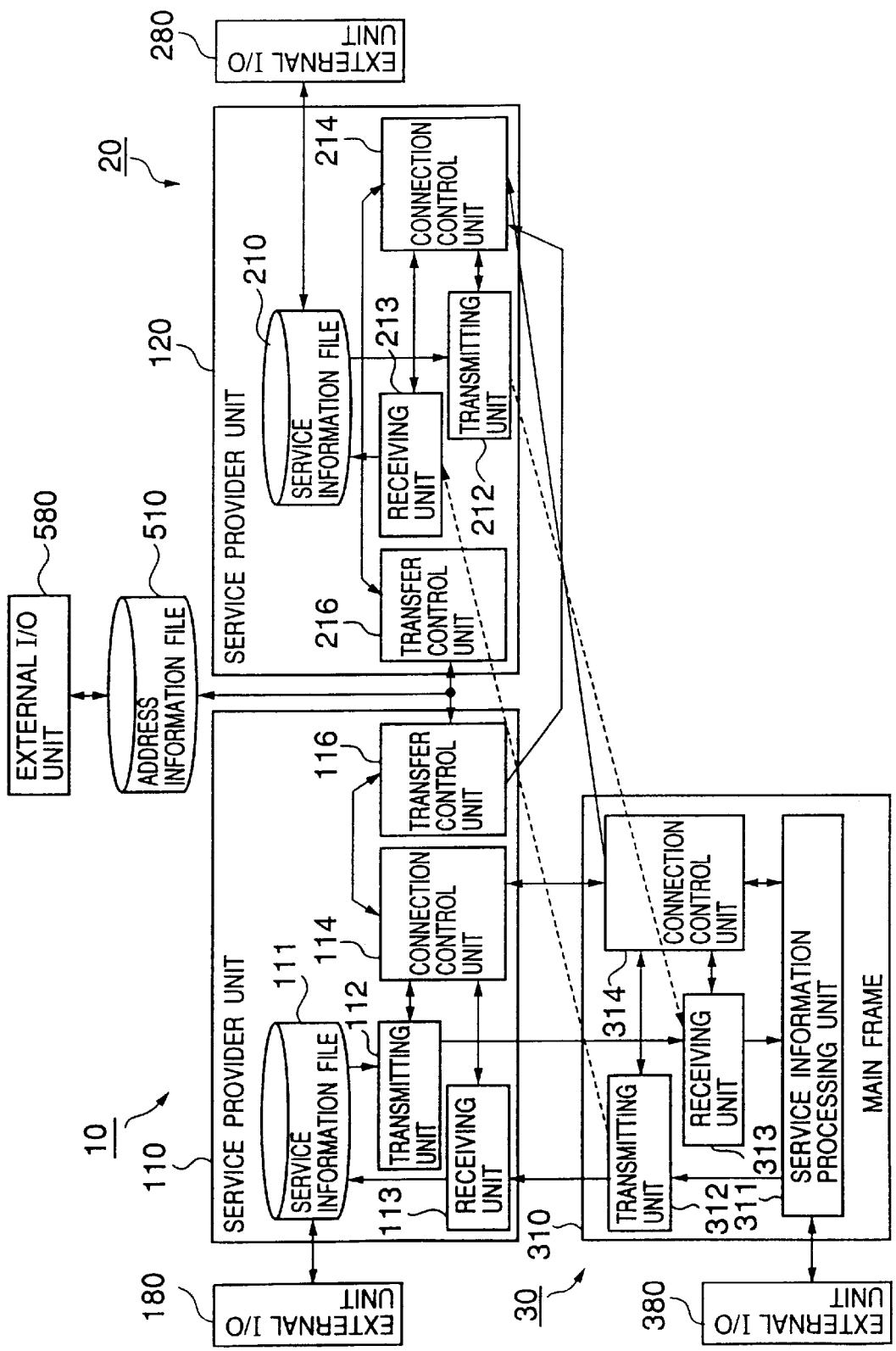
FIG. 25 is a block diagram showing a twenty-fourth example of a communication system.

FIG. 25 is a block diagram showing a twenty-fourth example of a communication system. A difference of the twenty-fourth example from the communication system shown in FIG. 23 will be explained hereinafter.

The communication system shown in FIG. 25 has no service-representative server 70 in the communication system as shown in FIG. 23. Consequently, each of two servers 10 and 20 shown in FIG. 25 work as an independent server looking from the clients. But those two servers 10 and 20 cooperate with one another in the form which will be explained later. In the communication system shown in FIG. 25, as compared with the communication system shown in FIG. 23, the servers 10 and 20 further comprise transfer control units 116 and 216, respectively. The communication system shown in FIG. 25 further comprises an address information file 510 and an external input and output unit 580. The address information file 510 may be provided for a plurality of servers 10 and 20 on a common basis. Thus, according to the communication system shown in FIG. 25, while only a single address information file is shown, it is acceptable on a hardware basis that each of the servers 10 and 20 is provided with an address information file and there is provided such an arrangement that when the contents of the address information files are rewritten, the servers inform one another of the rewritten contents so that the contents of the address information files always match between the servers 10 and 20. Alternatively, it is acceptable that there is provided such an arrangement that any one of the servers manages the address information file, and another server inquires of the server, who manages the address-information file, the contents of the address information file, if necessary. With respect to the external input and output unit 580, in case of a system in which each of a plurality of servers has the address information file, the external input and output unit 580 is integrated with the external input and output unit of the respective server. And in case of a system in which any one of the servers manages the address information file, the external input and output unit 580 is integrated with the external input and output unit of the server who manages the address information file, for example.

The address information file 510 registers addresses of a plurality of servers 10 and 20 which work in cooperation with one another. The external input and output unit 580 serves to rewrite and add the addresses registered in the address information file 510.

The transfer control units 116 and 216 of the servers 10 and 20 control a transfer as to an alteration in the two-way communications service to another server.

Assuming that the server 10 offers the two-way communications service to the client 30, when it is intended that the server 20 takes the place of the server 10, in the two-way communications service, the transfer control unit 116 of the server 10 detects the address of the server 20 from the address information file 510, and informs the connection control unit 214 of the server 20 of an address of the client 30 to request the server 20 to offer the client the two-way communications service to the client 30 and in addition to request of the connection control unit 114 of one's own (the server 10) that the two-way communications service for the client 30 is stopped.

Then, a communication between the connection control unit 114 of the server 10 and the connection control unit 314 of the client 30 is established to disconnect a circuit between the the server 10 and the client 30. Next, a communication between the connection control unit 214 of the server 20 and the connection control unit 314 of the client 30 is established to connect a circuit between the the server 20 and the client 30.

In this manner, constituting a system in such a manner that the services are able to be altered between the servers makes it possible to specialize services offered by the servers, thereby improving services for the clients.

Figure 26:
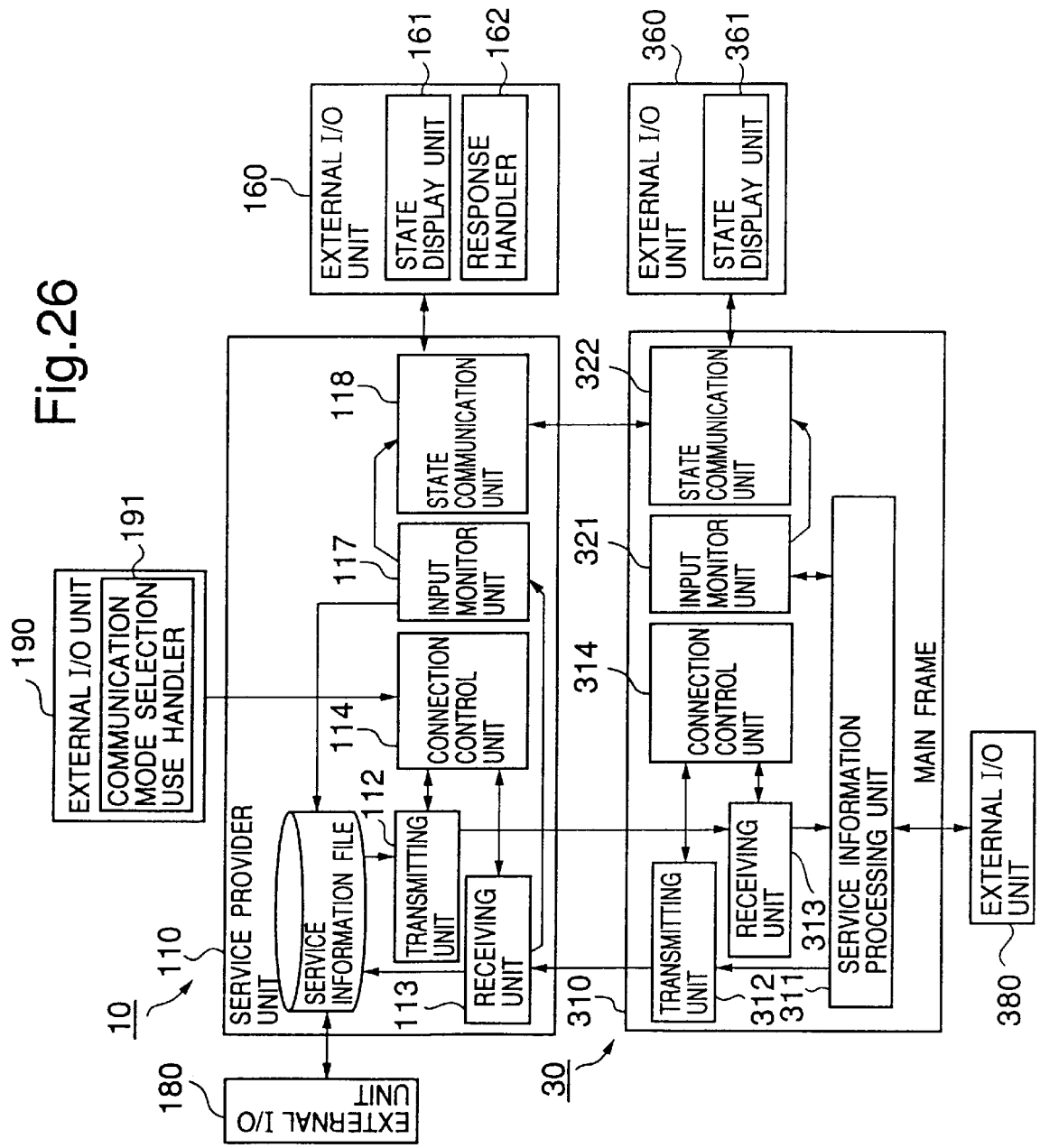
FIG. 26 is a block diagram showing a twenty-fifth example of a communication system.

FIG. 26 is a block diagram showing a twenty-fifth example of a communication system. A difference of the twenty-fifth example from the communication system shown in FIG. 2 will be explained hereinafter.

The communication system shown in FIG. 26 comprises a single server 10 and a single client 30. In the communication system shown in FIG. 26, as compared with the communication system shown in FIG. 2, the service provider unit 110 of the server 10 further comprises an input monitor unit 117 and a state communication unit 118, and an external input and output unit 160 is added. The external input and output unit 160 comprises a state display unit 161 and a response handler 162. It is acceptable that the external input and output unit 160 is the same as the external input and output unit 180 and the external input and output unit 190 on a hardware basis. Specifically, the image display unit 12, the keyboard 13 and the mouse 14 shown in FIG. 1 correspond to the external input and output unit 160. More in detail, the state display unit 161 corresponds to the image display unit 12, and the response handler 162 corresponds to the keyboard 13 or the mouse 14.

Further, in the communication system shown in FIG. 26, as compared with the communication system shown in FIG. 2, the main frame unit 310 of the client 30 further comprises an input monitor unit 321 and a state communication unit 322, and an external input and output unit 360 is added. The external input and output unit 360 comprises a state display unit 361. It is acceptable that the external input and output unit 360 is the same as the external input and output unit 380 on a hardware basis.

The input monitor unit 117 of the server 10 monitors whether an input of the new message directed from the external input and output unit 180 to the client 30 is initiated. If it is detected that the input of the new message is initiated, the input monitor unit 117 informs the state communication unit 118 of the matter. The state communication unit 118 informs the state communication unit 322 that the message is now being inputted. Then, it is displayed on the state display unit 361 of the client 30 that the server 10 is now being inputting a message addressed to the client 30 itself. Thus, an operator of the client 30 can know that messages will be transmitted to him soon. The inputted messages are transmitted via the transmitting unit 112 of the server 10 and the receiving unit 313 of the client 30 to the client 30. When the client 30 received the messages, this matter is informed via the input monitor unit 321 and the state communication unit 322 to the external input and output unit 360, and it is displayed on the state display unit 361 that the messages have been received.

The input monitor unit 321 of the client 30 monitors, when the client 30 receives the two-way communications service from the server 10, whether an input of the new message directed from the external input and output unit 380 to the server 10 is initiated. If it is detected that the input of the new message is initiated, the input monitor unit 321 informs the state communication unit 322 of the matter. The state communication unit 322 informs the state communication unit 118 that the-message is now being inputted. When the state communication unit 118 receives a notification that the message is now being inputted, the state communication unit 118 transmits such notification to the external input and output unit 160. When the client 30 completes an input of messages and the server 10 receives the messages, the receiving unit 113 of the server 10 informs of this matter the external input and output unit 160 via the input monitor unit 117 and the state communication unit 118. Then, it is displayed on the state display unit 161 of the external input and output unit 160 of the server 10 that it was informed for each client undergoing the two-way communications service that the server 10 is now being inputting a message, messages has been received, or the input of messages is not yet initiated.

The response handler 162 is for inputting it for each client whom the server 10 offers the two-way communications service to that an operator notes a display of the state display unit 161. In the state that the state display unit 161 is displaying that a new message has been received from some client, when it is inputted by the response handler 162 that the operator notes that the message has been received, the display is reset to a state that messages are not yet inputted. Thereafter, again, when on inputting message or message reception is notified, the display is altered in accordance with the notification.

Figure 27:
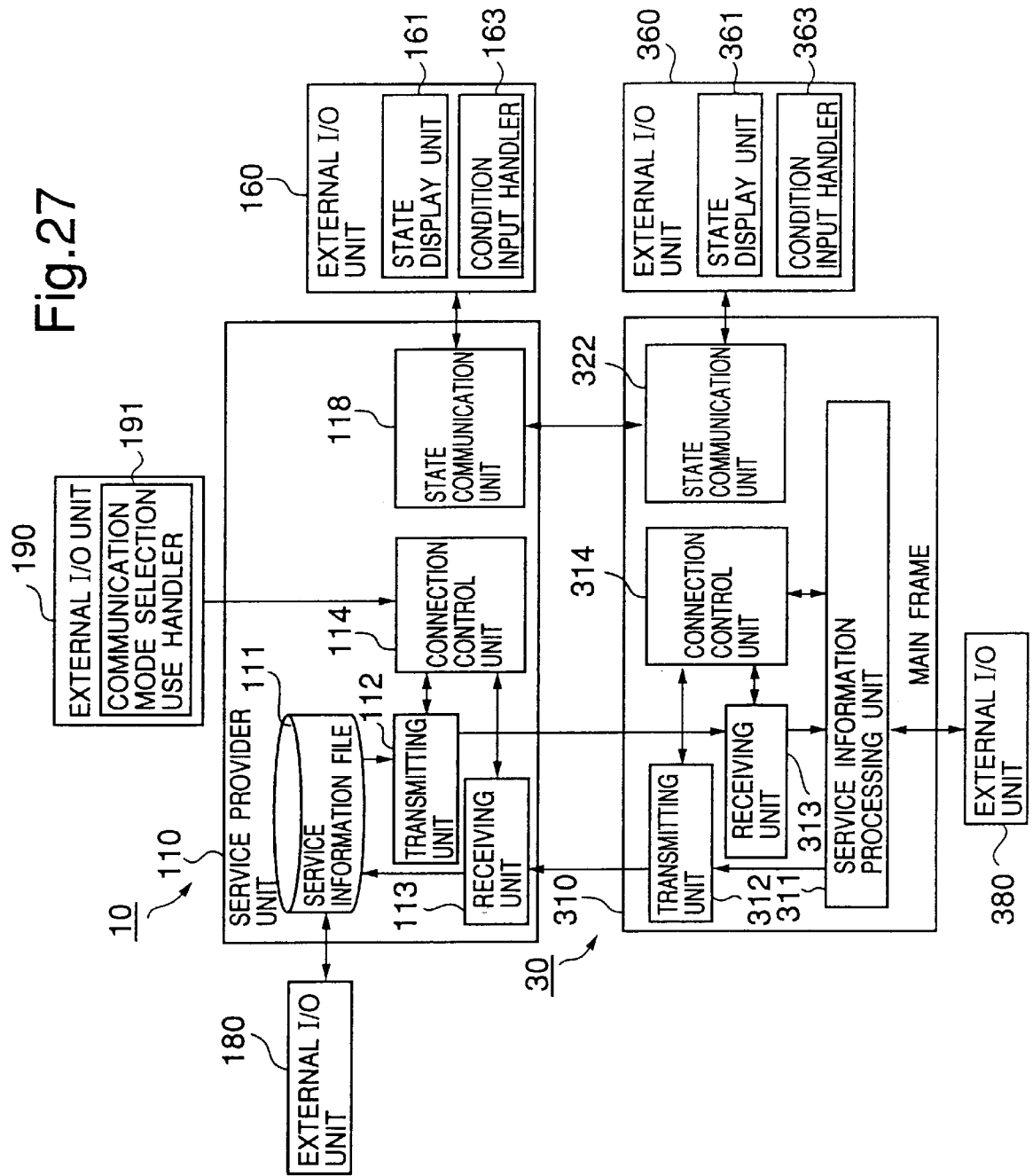
FIG. 27 is a block diagram showing a twenty-sixth example of a communication system.

FIG. 27 is a block diagram showing a twenty-sixth example of a communication system. A difference of the twenty-sixth example from the communication system shown in FIG. 26 will be explained hereinafter.

In the communication system shown in FIG. 27, as compared with the communication system shown in FIG. 26, regarding both the server 10 and the client 30, the input monitor units 117 and 321 in the communication system shown in FIG. 26 are omitted. The external input and output unit 160 of the server 10 has a condition input handler 163 instead of the response handler 162 of the external input and output unit shown in FIG. 26. Further, the external input and output unit 360 of the client 30 has a condition input handler 363.

In the state that the server 10 offers the two-way communications service to the client 30, in the event that an operator of the server 10 temporarily leave his seat, or in the event that the operator of the server 10 wishes to temporarily interrupt an interaction with the client 30 who devotes himself to a message interchange (an interaction) with another client, the operator of the server 10 inputs it through the condition input handler 163 that the interaction is now unavailable.

The information thus inputted is transmitted from the state communication unit 118 of the server 10 to the state communication unit 322. Thus, it is displayed on the state display unit 361 of the external input and output unit 360 of the client 30 that the interaction is now unavailable. When the operator of the server 10 is again in condition for acceptance of the interaction and this information is inputted through the condition input handler 163 of the external input and output unit 160 of the server 10, this information is displayed on the state display unit 361 of the external input and output unit 360 of the client 30.

This is the similar as to the matter of the event that an operator of the client 30 is temporarily in condition for refusal of the interaction with the server 10 and the event that the operator of the client 30 is again in condition for acceptance of the interaction. The condition of the operator of the client 30 is inputted through the condition input handler 363 of the external input and output unit 360 of the client 30, this information thus inputted is transmitted from the state communication unit 322 of the client 30 to the state communication unit 118 of the server 10, and is displayed on the state display unit 161 of the server 10.

Figure 28:
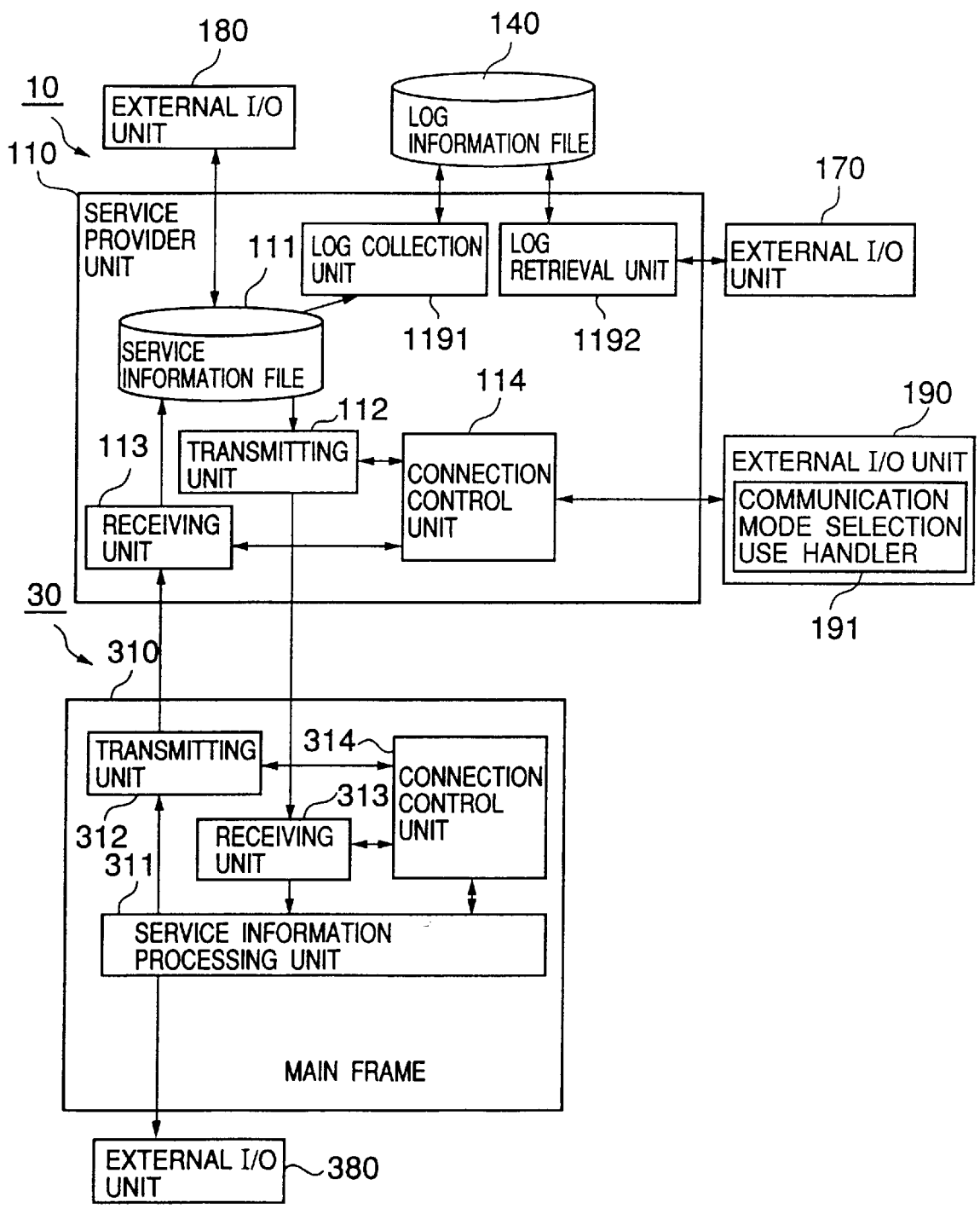
FIG. 28 is a block diagram showing a twenty-seventh example of a communication system.

FIG. 28 is a block diagram showing a twenty-seventh example of a communication system. A difference of the twenty-seventh example from the-communication system shown in FIG. 2 will be explained hereinafter.

In the communication system shown in FIG. 28, as compared with the communication system shown in FIG. 2, a log collection unit 1191, a log information file 140, a log retrieval unit 1192 and an external input and output unit 170 are added. The external input and output unit 170 is for use in an indication of a log retrieval, and is the same as the external input and output units 180 and 190 on a hardware basis.

The log collection unit 1191 collects an interaction with the client made during the two-way communications service, and records it into the log information file 140 together with a client ID, a starting time and a key word set up by an operator of the server 10. The log retrieval unit 1192 outputs log information to the external input and output unit 170 in accordance with an instruction from the external input and output unit 170, and conducts a retrieval of the log information file 140 on the basis of the key word.

Incidentally, while the above-mentioned explanation is concerned with a system in which a retrieval of log information and an output of log information are performed in accordance with an instruction from the external input and output unit 170 of the server 10, it is acceptable to provide such an arrangement that a retrieval of log information is performed in accordance with a request from a client, and the log information is transmitted to the client.

In this manner, filing the log information makes it possible to contribute to effective utilization of the past interaction contents.

Figure 29:
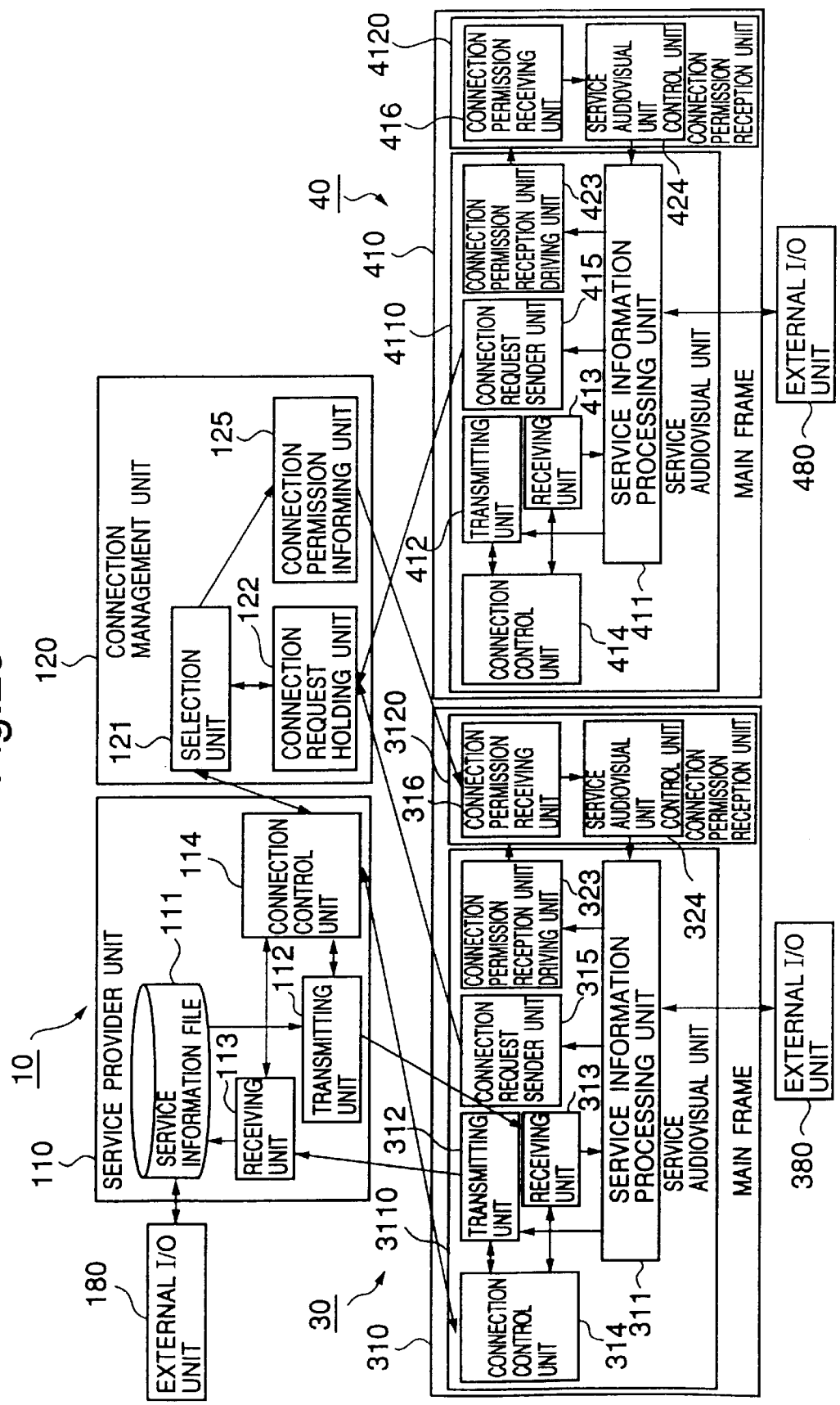
FIG. 29 is a block diagram showing a twenty-eighth example of a communication system.

FIG. 29 is a block diagram showing a twenty-eighth example of a communication system. A difference of the twenty-eighth example from the communication system shown in FIG. 15 will be explained hereinafter.

In the clients 30 and 40, connection permission reception unit driving units 323 and 423, and service audiovisual unit control units 324 and 424 are added, respectively. The service information processing units 311 and 411, the transmitting units 312 and 412, the receiving units 313 and 413, the connection control units 314 and 414, the connection request sender units 315 and 415, and the connection permission reception unit driving units 323 and 423 are integrated in the form of service audiovisual units 3110 and 4110, respectively. The connection permission receiving units 316 and 416, and the service audiovisual unit control units 324 and 424 are integrated in the form of integrated in the form of connection permission reception units 3120 and 4120, respectively.

Typically, the client 30 will be described hereinafter. When an operator of the client 30 operates the external input and output unit 380 to input a command to request the two-way communications service, the connection request sender unit 315 requests of the server 10 the two-way communications service. This request is held by the connection request holding unit 122. Thereafter, the operator of the client 30 operates the external input and output unit 380 to cause the service audiovisual unit 3110 to be inactive so as to provide such a processing that the service audiovisual unit 3110 serves as an icon. On the other hand, the connection permission reception unit driving unit 323 actuates the connection permission reception unit 3120, and thereafter the service audiovisual unit 3110 becomes an idle state. This feature causes only a small scale of portion such as the connection permission reception unit 3120 to be operative, and thus makes it possible that the computer system of the client 30 performs processings other than the function as clients referred to here.

The server 10 issues a connection permission notification giving notice of the start of the two-way communications service, the connection permission notification is received by the connection permission receiving unit 316 of the connection permission reception unit 3120. When the connection permission receiving unit 316 receives the connection permission notification, the service audiovisual unit control units 324 activates the service audiovisual unit 3110. This arrangement of the system makes it possible to use the computer system of the client 30 for the purpose of another object during a period of the time since the two-way communications service is requested until it is permitted.

Figure 30:
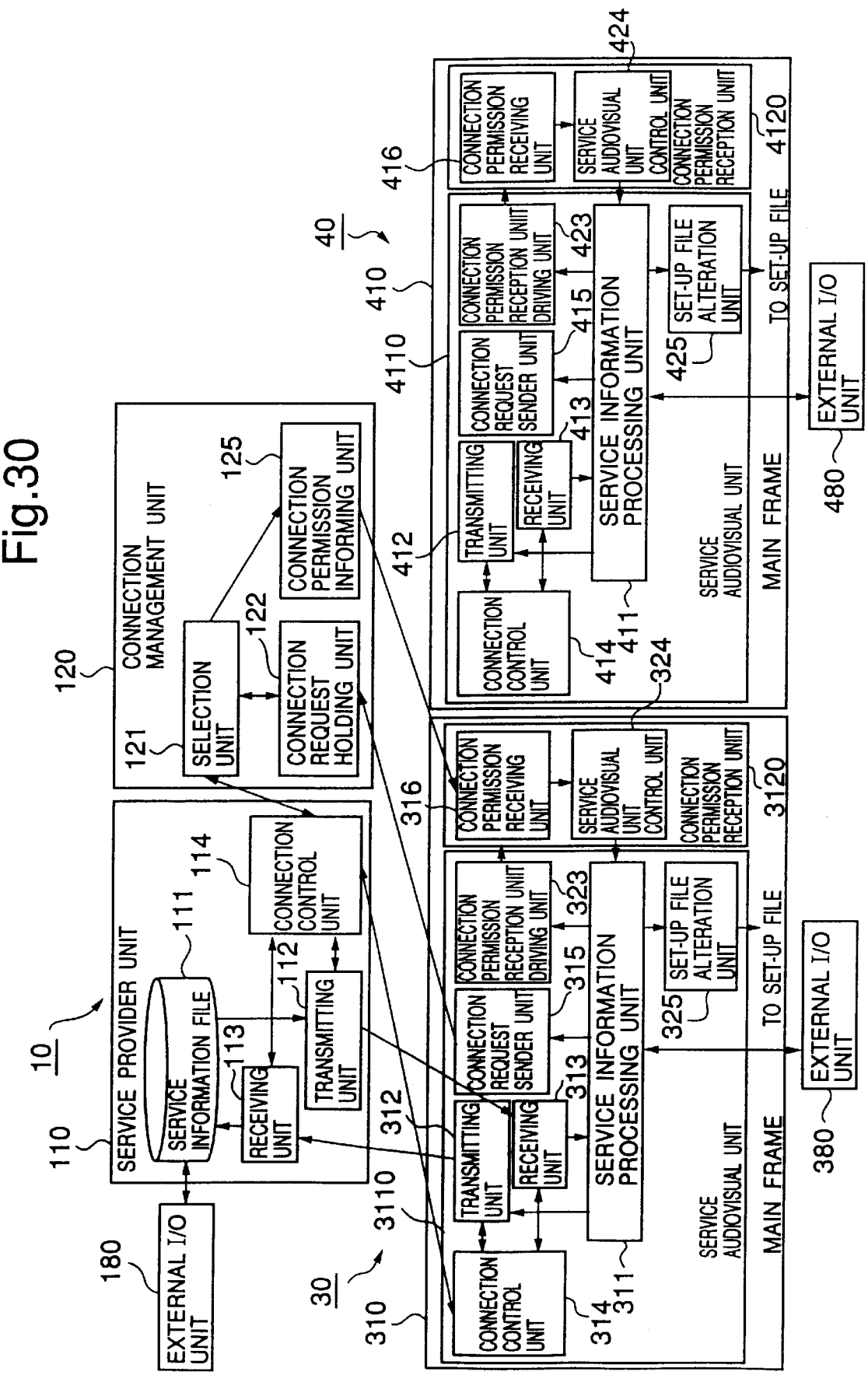
FIG. 30 is a block diagram showing a twenty-ninth example of a communication system.

FIG. 30 is a block diagram showing a twenty-ninth example of a communication system. A difference of the twenty-ninth example from the communication system shown in FIG. 29 will be explained hereinafter.

In the communication system shown in FIG. 30, as compared with the communication system shown in FIG. 29, set-up file alteration units 325 and 425 are added into the service audiovisual units 3110 and 4110 of the clients 30 and 40, respectively.

Typically, the client 30 will be described hereinafter. A set-up file is activated when a power source of the client 30 is turned on. The set-up file alteration unit 325 rewrites the set-up file so that the connection permission reception unit 3120 is activated when the power source of the client 30 is turned on.

According to this arrangement, even if the power source of the client 30 is turned off once after requesting of the server 10 the two-way communications service, the connection permission reception unit 3120 is activated when the power source is turned on again. Thus, when the server 10 issues a connection permission notification, the connection permission notification can be received as far as the power source of the client 30 turns on at the time when the connection permission notification is issued, so that the service audiovisual units 3110 is activated. Thus, it is possible to receive the two-way communications service.

FIG. 31 is a block diagram showing a thirtieth example of a communication system. A difference of the thirtieth example from the communication system shown in FIG. 30 will be explained hereinafter.

In the communication system shown in FIG. 31, as compared with the communication system shown in FIG. 30, the client 40 is omitted, a connection permission holding unit 1291 is added into the connection management unit 120 of the server 10, and a connection permission confirming unit 326 is added into the connection permission reception unit 3120 of the client 30.

It is assumed that a vacancy comes in the two-way communications service of the server 10 and any client (here client 30) is selected by the selection unit 121 from among the clients waiting a vacancy, who are held in the connection request holding unit 122. Then, the connection permission informing unit 125 issues a connection permission notification to the client 30. At that time, if the power source of the client 30 is turned off, the connection permission notification will not arrive at the client 30. In this case, it is held by the connection permission holding unit 1291 that the connection permission notification was already issued to the client 30. When the power source of the client 30 is turned on, the connection permission reception unit 3120 is activated, so that the connection permission confirming unit 326 inquires of the connection permission holding unit 1291 whether the connection permission notification was already issued to himself (client 30). When it is decided that the connection permission notification was already issued to himself (client 30), then the service audiovisual units 3110 is activated by the service audiovisual unit control units 324, and thus the client can receive the two-way communications service of the server 10.

Thus, even in the event that the connection permission notification is issued while the power source of a client is turned off, the client can receive the two-way communications service of the server.

As mentioned above, according to the present invention, it is possible to perform a suitable processing in the event that a communication service, which is limited in the number of joining members, reaches a capacity of joining members, or a vacancy comes in the communication service.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A server connected via a network to a plurality of clients for offering information to the plurality of clients, said server comprising:

communication mode selection means for switching over a communication mode for each client between a one-way communication mode in which information is offered to clients on a one-way basis and a two-way communication mode in which messages are transmitted to clients and messages transmitted from the clients are received; and a profile data base storing profiles of clients as to utilization circumstances of the server, wherein said communication mode selection means switches over the communication mode as to a client selected referring to said profile data base from among the clients identified by information held by request holding means, from the one-way communication mode to the two-way communication mode, wherein said communication mode selection means comprising said request holding means for holding the information to identify a client who made a request of a two-way communication service, and switches over the communication mode as to a client selected from among the clients identified by the information held by said request holding means from the one-way communication mode to the two-way communication mode.

2. A server according to claim 1, wherein said profile data base includes information representative of a cumulative time on each client regarding accumulation of two-way communication services of the server, and said communication mode selection means switches over the communication mode as to a client involved in the longest time in the cumulative time, of the clients identified by the information held by said request holding means, from the one-way communication mode to the two-way communication mode.

3. A server according to claim 1, wherein said profile data base includes information representative of an acceptance time on each client regarding last two-way communication service of the server, and said communication mode selection means switches over the communication mode as to a client involved in the longest time in a time elapsed since the client received the last two-way communication service of the server, of the clients identified by the information held by said request holding means, from the one-way communication mode to the two-way communication mode.

4. A server connected via a network to a plurality of clients for offering information to the plurality of clients, said server comprising:

communication mode selection means for switching over a communication mode for each client between a one-way communication mode in which information is offered to clients on a one-way basis and a two-way communication mode in which messages are transmitted to clients and messages transmitted from the clients are received; and an information display unit for displaying information held by request holding means, and a client designation handler for designating a client to be switched in the communication mode from the one-way communication mode to the two-way communication mode, from among the clients identified by the information held by said request holding means, wherein said communication mode selection means switches over the communication mode as to a client designated through operation of said client designation handler, from the one-way communication mode to the two-way communication mode, wherein said communication mode selection means comprises said request holding means for holding the information to identify a client who made a request of a two-way communication service, and switches over the communication mode as to a client selected from among the clients identified by the information held by said request holding means from the one-way communication mode to the two-way communication mode.

5. A server according to claim 4, wherein said request holding means accepts a request of a two-way communication service issued from clients and also information associated with messages intended to be transmitted to the server when an associated client receives the two-way communication service, and holds information to identify clients who made the request of the two-way communication service and in addition information for each client associated with messages intended to be transmitted to the server, and wherein said information display unit displays the information to identify clients who made the request of the two-way communication service, said information being held by said request holding means, and also the information for each client associated with messages intended to be transmitted to the server.

6. A server according to claim 4 further comprising a profile data base for storing profiles of clients as to utilization circumstances of the server, wherein said information display unit displays the information held by said request holding means, and also the profiles stored in the said profile data base.

7. A server connected via a network to a plurality of clients for offering information to the plurality of clients, said server comprising:

a communication mode selection use handler switching over a communication mode for each client between a one-way communication mode in which information is offered to clients on a one-way basis and a two-way communication mode in which messages are transmitted to clients and messages transmitted from the clients are received, said communication mode selection use handler comprising:

request holding means for holding information to identify a client made a request of a two-way communication service, and switches over the communication mode as to a client selected from among the clients identified by the information held by said request holding means from the one-way communication mode to the two-way communication mode, and two-way communication service start notice means for giving notice, prior to altering a communication mode as to a client selected from among the clients identified by the information held by said request holding means, of a start of a two-way communication service to the client, wherein said communication mode selection use handler switches over, upon receipt of a notification of complete preparation representative of a matter that a preparation for receiving a two-way communication service has been completed from the client who received the notice of the start of the two-way communication service by said two-way communication service start notice means, the communication mode as to the client from the one-way communication mode to the two-way communication mode.

8. A server according to claim 7, wherein said communication mode selection use handler comprises notification holding means for holding information to identify a client issued the notification of complete preparation, and switches over the communication mode as to the client identified by the information held by said notification holding means from the one-way communication mode to the two-way communication mode.

* * * * *